United States Patent
Jeong et al.

(10) Patent No.: US 11,899,531 B2
(45) Date of Patent: Feb. 13, 2024

(54) STORAGE DEVICE AND OPERATING METHOD OF STORAGE CONTROLLER

(71) Applicant: SAMSUNG ELECTRONICS CO., LTD., Suwon-si (KR)

(72) Inventors: Sungwon Jeong, Suwon-si (KR); Moonsang Kwon, Seoul (KR); Younghoi Heo, Uijeongbu-si (KR); Jaeshin Lee, Seoul (KR); Eun Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 17/563,422

(22) Filed: Dec. 28, 2021

(65) Prior Publication Data
US 2022/0365842 A1 Nov. 17, 2022

(30) Foreign Application Priority Data
May 14, 2021 (KR) .................. 10-2021-0062816

(51) Int. Cl.
*G06F 11/10* (2006.01)
*G06N 20/00* (2019.01)

(52) U.S. Cl.
CPC ......... *G06F 11/1004* (2013.01); *G06N 20/00* (2019.01)

(58) Field of Classification Search
CPC .. G06F 11/1004; G06F 11/10; G06F 11/1044; G06N 20/00; G11C 29/42

(Continued)

(56) References Cited

U.S. PATENT DOCUMENTS 7,483,321 B2 1/2009 Lee
8,880,970 B2 11/2014 Gillingham
(Continued)

FOREIGN PATENT DOCUMENTS

JP 2014-241057 A 12/2014
KR 10-2006-0122517 A 11/2006
(Continued)

OTHER PUBLICATIONS

Communication dated Jun. 27, 2022 issued by the European Patent Office in counterpart European Application No. 22151718.8.
(Continued)

*Primary Examiner* — James C Kerveros
(74) *Attorney, Agent, or Firm* — Sughrue Mion, PLLC

(57) ABSTRACT

A storage device and an operating method thereof are provided. The storage device includes a non-volatile memory and a storage controller. The storage controller includes a command and address generator, an error detection module, and an interface circuit. The command and address generator generates a first command, an address, and a second command, the second command including an error detection signal for detecting a communication error in the first command and the address. The error detection module generates the error detection signal from the first command and the address. The interface circuit sequentially transmits the first command, the address, and the second command to the non-volatile memory. The first command indicates a type of a memory operation to be performed in the non-volatile memory, and the second command corresponds to a confirm command.

20 Claims, 26 Drawing Sheets

(58) Field of Classification Search
USPC .......................................................... 714/763
See application file for complete search history.

(56) References Cited

U.S. PATENT DOCUMENTS

| | | | | |
|---|---|---|---|---|
| 9,158,616 | B2* | 10/2015 | Bains | .................. G06F 11/1016 |
| 9,389,953 | B2 | 7/2016 | Choi et al. | |
| 9,792,173 | B2* | 10/2017 | Adachi | ............... G06F 13/1689 |
| 10,090,858 | B2 | 10/2018 | Cho et al. | |
| 10,809,695 | B2 | 10/2020 | Mizusawa | |
| 10,896,114 | B2 | 1/2021 | Savanur | |
| 2014/0089755 | A1* | 3/2014 | Kantamsetti | ........ G06F 11/1048 |
| | | | | 714/763 |
| 2014/0250353 | A1* | 9/2014 | Choi | .................. G06F 11/1048 |
| | | | | 714/800 |
| 2014/0372816 | A1* | 12/2014 | Bains | ................. G06F 11/1004 |
| | | | | 714/723 |
| 2018/0219562 | A1* | 8/2018 | Lee | ..................... H03M 13/098 |
| 2019/0042147 | A1 | 2/2019 | Kang et al. | |
| 2019/0065237 | A1 | 2/2019 | Lee et al. | |
| 2020/0004625 | A1 | 1/2020 | Borlick et al. | |
| 2020/0110659 | A1 | 4/2020 | Foley | |
| 2021/0350870 | A1* | 11/2021 | Ware | ................... G06F 11/1016 |

FOREIGN PATENT DOCUMENTS

| | | |
|---|---|---|
| KR | 10-2016-0144564 A | 12/2016 |
| KR | 10-2017-0070921 A | 6/2017 |

OTHER PUBLICATIONS

Communication dated Jul. 6, 2021, issued by the Korean Intellectual Property Office in Korean Application No. 10-2021-0062816.

* cited by examiner

STORAGE DEVICE AND OPERATING METHOD OF STORAGE CONTROLLER

CROSS-REFERENCE TO RELATED APPLICATION

This application is based on and claims priority under 35 U.S.C. § 119 to Korean Patent Application No. 10-2021-0062816, filed on May 14, 2021, in the Korean Intellectual Property Office, the disclosure of which is incorporated by reference herein in its entirety.

BACKGROUND

The present disclosure relates to a memory device, and more particularly, to a storage controller having a communication error detection function of a command/address, a storage device including the storage controller, and an operating method of the storage controller.

The storage controller may use an error correction code (ECC) engine to detect and correct errors occurring during transmission or reception of data. However, a storage controller of the related art does not have a configuration for detecting errors occurring during transmission of a command and an address. Therefore, even when an error occurs in a command and an address transmitted to a non-volatile memory from the storage controller, the error is difficult to detect and correct.

SUMMARY

It is an aspect to provide a storage device capable of detecting a communication error in a command and an address and an operating method of a storage controller.

According to an aspect of an embodiment, there is provided a storage device comprising a non-volatile memory; and a storage controller configured to control the non-volatile memory. The storage controller comprises a command and address generator configured to generate a first command, an address, and a second command, the second command including an error detection signal for detecting a communication error in the first command and the address; an error detection module configured to generate the error detection signal from the first command and the address; and an interface circuit configured to sequentially transmit the first command, the address, and the second command to the non-volatile memory, wherein the first command indicates a type of a memory operation to be performed in the non-volatile memory, and the second command corresponds to a confirm command.

According to another aspect of an embodiment, there is provided a storage device comprising a non-volatile memory; and a storage controller configured to control the non-volatile memory. The storage controller comprises a command and address generator configured to generate a plurality of commands and a plurality of addresses; a machine learning module configured to predict whether a communication error occurs in a command and an address to be provided to the non-volatile memory, based on a communication error rate of the plurality of commands and the plurality of addresses, and based on a determination error rate of the plurality of commands and the plurality of addresses; an error detection module configured to generate an error detection signal from the command and the address when it is predicted that the communication error has occurred; and an interface circuit configured to transmit the command, the address, and the error detection signal to the non-volatile memory when it is predicted that the communication error has occurred.

According to another aspect of an embodiment, there is provided an operating method of a storage controller configured to control a non-volatile memory, the operating method comprising performing, by a machine learning module, learning whether a communication error occurs in each of first commands and addresses transmitted from the storage controller to the non-volatile memory in a first period; performing, by the machine learning module, learning whether a communication error occurs in each of second commands and addresses transmitted from the storage controller to the non-volatile memory in a second period after the first period; determining whether a communication error occurs in each of the second commands and addresses and collecting determination data according to a result of the determination in the second period; when the second period ends, comparing a sum of a communication error rate of the first commands and addresses and the second commands and addresses and a determination error rate based on the determination data, with a reference value; and predicting whether a communication error occurs in a command and an address by applying a machine learning determination system when the sum of the communication error rate and the determination error rate is less than the reference value.

According to another aspect of an embodiment, there is provided a storage device comprising a non-volatile memory; and a storage controller configured to control the non-volatile memory. The storage controller comprises a command and address generator configured to generate a command and an address; an error detection module including a plurality of error detection logics including a first error detection logic and a second error detection logic, and the error detection module configured to generate an error detection signal with respect to the command and the address by using an error detection logic selected from among the plurality of error detection logics; and an interface circuit configured to sequentially transmit the command, the address, and the error detection signal to the non-volatile memory. The error detection module is further configured to perform error detection on each of a plurality of commands and addresses by applying the first error detection logic; and change the selected error detection logic from the first error detection logic to the second error detection logic according to a comparison result between a communication error rate of the plurality of commands and addresses and an error rate of the first error detection logic.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments will be described in detail with reference to the accompanying drawings.

Figure 1:
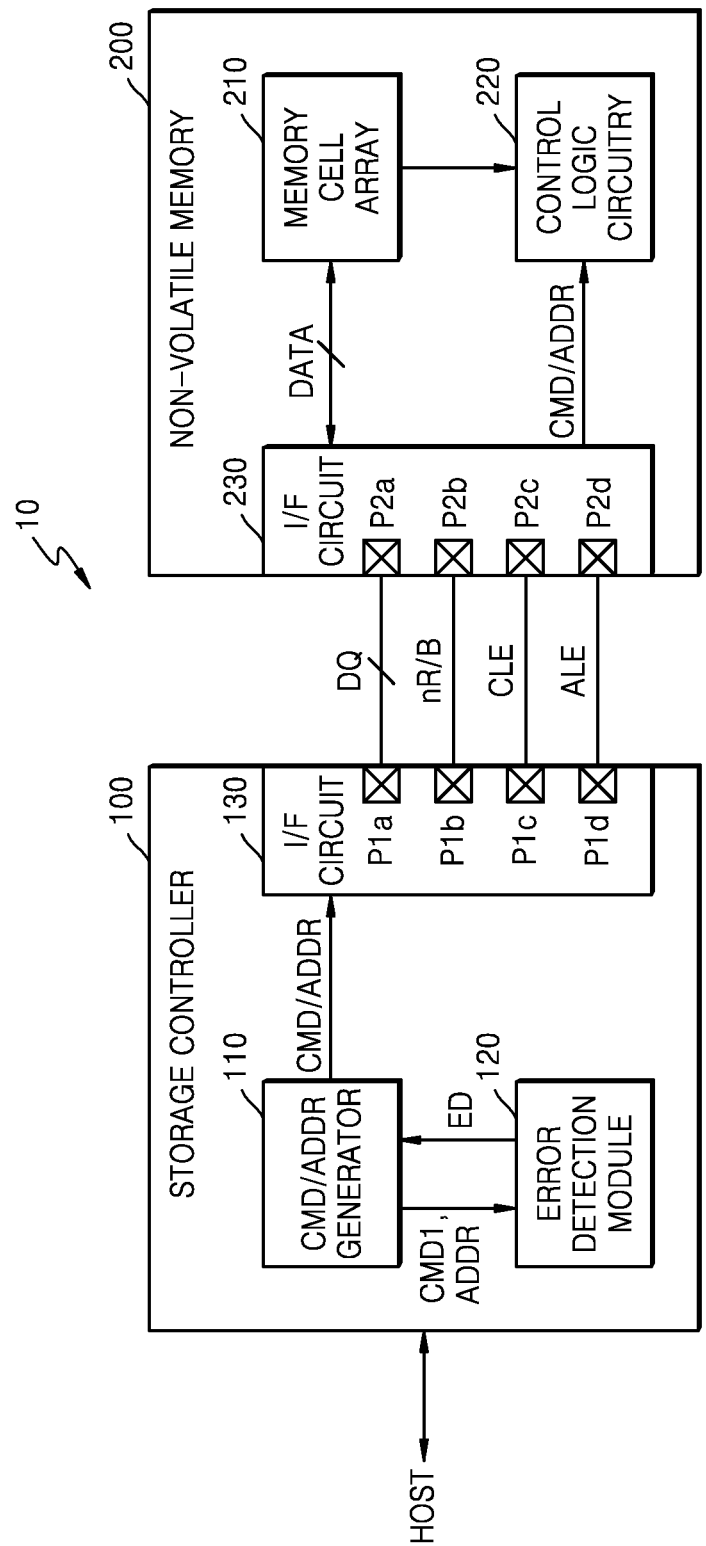
FIG. 1 is a block diagram of a storage device according to an embodiment.

FIG. 1 is a block diagram of a storage device 10 according to an embodiment.

Referring to FIG. 1, the storage device 10 may include a storage controller 100 and a non-volatile memory 200. The storage device 10 may include a storage medium for storing data according to a request from a host. For example, the storage device 10 may include at least one of a solid-state drive (SSD), an embedded memory, and a removable external memory. When the storage device 10 is an SSD, the storage device 10 may be a device conforming to the non-volatile memory express (NVMe) standard. When the storage device 10 is an embedded memory or an external memory, the storage device 10 may be a device conforming to the universal flash storage (UFS) or embedded multimedia card (eMMC) standard.

According to an embodiment, the storage controller 100 may be referred to as a controller, a device controller, or a memory controller. In an embodiment, the non-volatile memory 200 may include a flash memory, and in this case, the storage controller 100 may be referred to as a flash memory controller (FMC). According to an embodiment, the non-volatile memory 200 may be embodied as a plurality of memory chips or a plurality of memory dies. For example, each of the plurality of memory chips may be a Dual Die Package (DDP), a Quadruple Die Package (QDP), or an Octuple Die Package (ODP).

The storage controller 100 may control the non-volatile memory 200 to write data to the non-volatile memory 200 in response to a write request from the host or to read data from the non-volatile memory 200 in response to a read request from the host. According to the embodiment of FIG. 1, the storage controller 100 may include a command and address generator (CMD/ADDR GENERATOR) 110, an error detection module 120, an interface (I/F) circuit 130, and first pins P1$a$, a second pin P1$b$, a third pin P1$c$, and a fourth pin P1$d$. The first to fourth pins P1$a$ to P1$d$ may correspond to first pins P2$a$, a second pin P2$b$, a third pin P2$c$, and a fourth pin P2$d$ of the non-volatile memory 200, respectively.

The command and address generator (CMD/ADDR GENERATOR) 110 may generate a command/address CMD/ADDR to control the non-volatile memory 200. In an embodiment, the command/address CMD/ADDR may be a command set including a first command CMD1, an address ADDR and a second command (e.g., CMD2 in FIG. 2A) that are sequentially transmitted to the non-volatile memory 200. The first command CMD1 may indicate the type of a memory operation, and the second command CMD2 may indicate a memory operation associated with the first command CMD1. According to an embodiment, the first command CMD1 may be referred to as an "input command" and the second command CMD2 may refer to a "confirm command" or a "done command".

The error detection module 120 may generate an error detection signal ED for detecting a communication error in the command/address CMD/ADDR. According to an embodiment, the error detection module 120 may be referred to as a "command error detection module", a "command/address error detection module" or a "command set error detection module". For example, the error detection signal ED may be a 1-bit signal. However, embodiments are not limited thereto, and in some embodiments the error detection signal ED may be a multi-bit signal. Specifically, the error detection module 120 may generate the error detection signal ED from the first command CMD1 and the address ADDR generated by the command and address generator 110 and transmit the generated error detection signal ED to the command and address generator 110.

In an embodiment, the error detection module 120 may generate a parity bit from the first command CMD1 and the address ADDR and output the generated parity bit as the error detection signal ED. In an embodiment, the error detection module 120 may generate a cyclic redundancy check (CRC) value from the first command CMD1 and the address ADDR and output the CRC value as the error detection signal ED. In an embodiment, the error detection module 120 may generate a checksum from the first command CMD1 and the address ADDR and output the generated checksum as the error detection signal ED. However, the embodiments are not limited thereto, and in various embodiments the error detection module 120 may generate the error detection signal ED from the first command CMD1 and the address ADDR by using various error detection programs or error detection logics.

The interface (I/F) circuit 130 may transmit a plurality of data signals DQ to the non-volatile memory 200 through the first pins P1$a$ or receive the plurality of data signals DQ from the non-volatile memory 200. The command CMD, the address ADDR, and the data may be transmitted through the plurality of data signals DQ. For example, each of the plurality of data signals DQ may be transmitted through one of a plurality of data signal lines. An embodiment in which the number of first pins P1a is eight will be described below. However, the embodiments are not limited thereto, and in other embodiments the number of first pins P1a may be variously changed.

The interface (I/F) circuit 130 may receive a ready/busy output signal nR/B indicating status information of the non-volatile memory 200 from the non-volatile memory 200 through the second pin P1b. In addition, the interface (I/F) circuit 130 may provide a command latch enable signal CLE and an address latch enable signal ALE to the non-volatile memory 200 through the third pin P1c and the fourth pin P1d, respectively. The interface (I/F) circuit 130 may transmit the command latch enable signal CLE that is in an enabled state to transmit data signals DQ including the command CMD to the non-volatile memory 200, and transmit the address latch enable signal ALE that is in the enabled state to transmit data signals DQ including the address ADDR to the non-volatile memory 200.

The non-volatile memory 200 may include a memory cell array 210, a control logic circuitry 220, and an interface (I/F) circuit 230. The interface (I/F) circuit 230 may receive a plurality of data signals DQ from or transmit the plurality of data signal DQ to the storage controller 100 through the first pins P2a. In addition, the interface (I/F) circuit 230 may receive the command latch enable signal CLE and the address latch enable signal ALE from the storage controller 100 through the third pin P2c and the fourth pin P2d, respectively.

The interface (I/F) circuit 230 may transmit the ready/busy output signal nR/B to the storage controller 100 through the second pin P2b. When the non-volatile memory 200 is in a busy state (i.e., when internal operations of the non-volatile memory 200 are being performed), the interface (I/F) circuit 230 may transmit the ready/busy output signal nR/B indicating the busy state to the storage controller 100. When the non-volatile memory 200 is in a ready state (i.e., when the internal operations of the non-volatile memory 200 are not being performed or are completed), the interface (I/F) circuit 230 may transmit the ready/busy output signal nR/B indicating the ready state to the storage controller 100. For example, while the non-volatile memory 200 reads the data DATA from the memory cell array 210 in response to a read command, the interface (I/F) circuit 230 may transmit the ready/busy output signal nR/B indicating the busy state (e.g., a low level) to the storage controller 100. For example, when the memory device 200 is programming the data DATA to the memory cell array 210 in response to a program command, the interface (I/F) circuit 230 may transmit the ready/busy output signal nR/B indicating the busy state to the storage controller 100.

The memory cell array 210 may include a plurality of memory cells. For example, the plurality of memory cells may be flash memory cells. However, the embodiments are not limited thereto, and in various embodiments the memory cells may include resistive random access memory (RRAM) cells, ferroelectric RAM (FRAM) cells, phase-change RAM (PRAM) cells, thyristor RAM (TRAM) cells, and magnetic RAM (MRAM) cells. Memory cells will be described below with respect to embodiments in which the memory cells are NAND flash memory cells.

The control logic circuitry 220 may generally control various operations of the non-volatile memory 200. The control logic circuitry 220 may identify, as the command CMD, data signals DQ received through the first pins P2a in an enable section of the command latch enable signal CLE and identify, as the address ADDR, data signal DQ received through the first pins P2a in an enable section of the address latch enable signal ALE. The control logic circuitry 220 may generate control signals for controlling other components of the non-volatile memory 200 according to the command/address CMD/ADDR. For example, the control logic circuitry 220 may generate various control signals for programming the data DATA to or reading the data DATA from the memory cell array 210.

In an embodiment, the control logic circuitry 220 may determine whether a communication error has occurred in the command/address CMD/ADDR according to the error detection signal ED included in the command/address CMD/ADDR. When it is determined that a communication error has occurred in the command/address CMD/ADDR, the non-volatile memory 200 may transmit an error message (e.g., E of FIG. 2B) to the storage controller 100. For example, the error message E may be transmitted to the storage controller 100 through the first pins P2a. When a communication error has not occurred in the command/address CMD/ADDR, the non-volatile memory 200 may perform a memory operation according to the command/address CMD/ADDR. For example, when the command/address CMD/ADDR includes a read command, the data DATA may be read from the memory cell array 210, as described in more detail with reference to FIGS. 2A, 2B and 3 below. For example, when the command/address CMD/ADDR includes a write command, the data DATA may be written to the memory cell array 210, as described in more detail with reference to FIGS. 4A, 4B and 5 below.

Figure 2A:
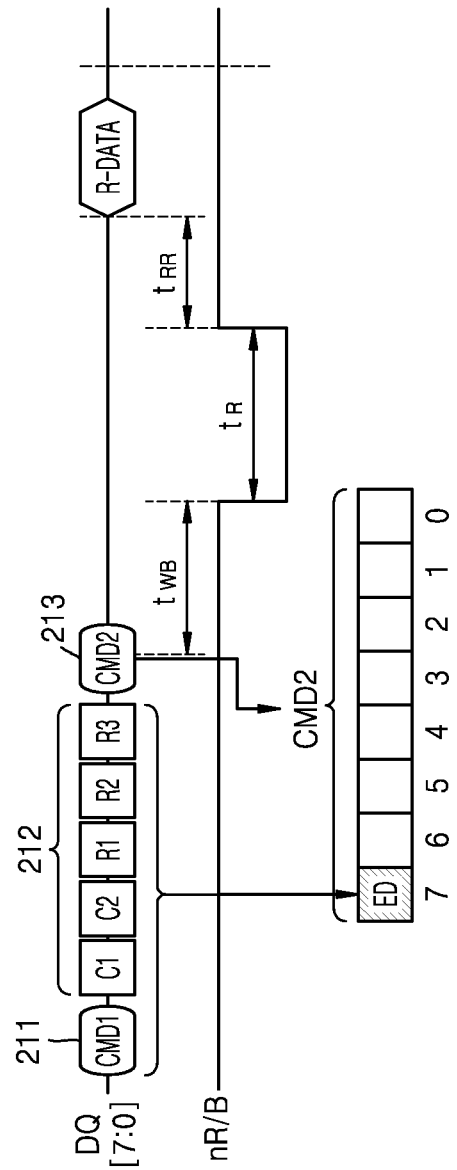
FIGS. 2A and 2B are timing diagrams illustrating communication between a storage controller and a non-volatile memory during a read operation of the non-volatile memory according to an embodiment.
Figure 2B:
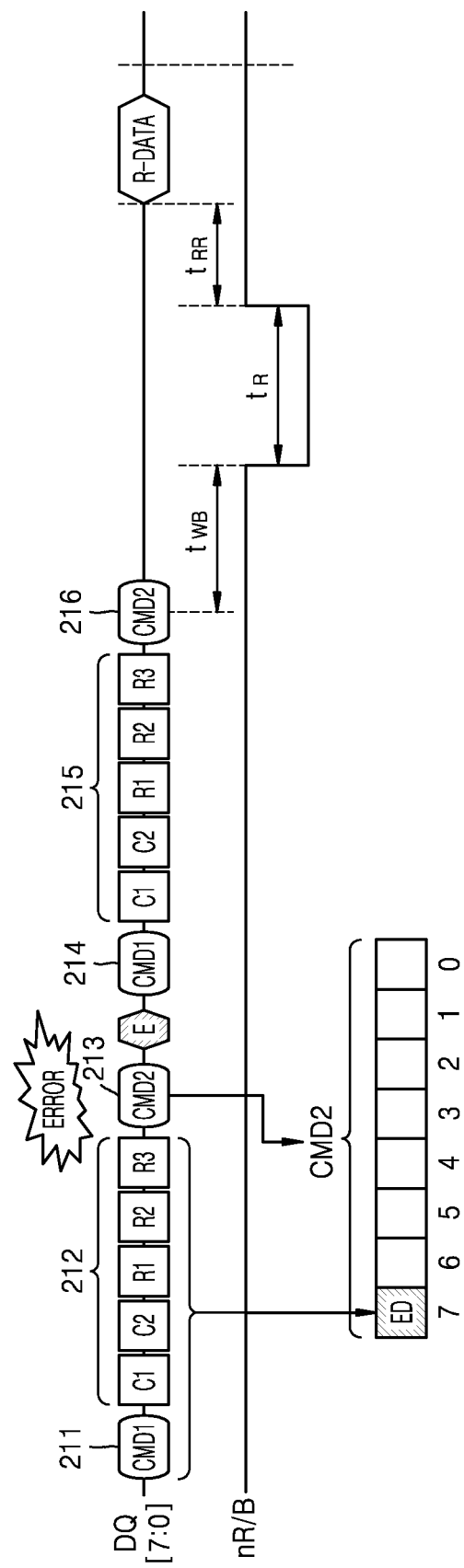

FIGS. 2A and 2B are timing diagrams illustrating communication between the storage controller 100 and the non-volatile memory 200 of FIG. 1 during a read operation of the non-volatile memory 200 according to an embodiment.

Referring to FIGS. 1 and 2B, the storage controller 100 may sequentially transmit a first command CMD1 211, an address 212, and a second command CMD2 213 to the non-volatile memory 200 through a plurality of data signal lines. The first command CMD1 211 may include an input command (e.g., 00h) indicating that a type of a memory operation is a read operation, and the address 212 may include a first column address C1 and a second column address C2 and a first row address R1, a second row address R2, and a third row address R3. The second command CMD2 213 may be a confirm command indicating the size of a page to be read. For example, when the size of the page to be read is 4 KB, the second command CMD2 213 may include a 4-KB read command 50h. For example, when the size of the page to be read is 8 KB, the second command CMD2 213 may include an 8-KB read command 20h. For example, when the size of the page to be read is 16 KB, the second command CMD2 213 may include a 16-KB read command 30h.

In an embodiment, the error detection module 120 may generate an error detection signal ED from the first command CMD1 211 and the address 212, and the command and address generator 110 may generate the second command CMD2 213 such that a reserved bit of the second command CMD2 213 includes the error detection signal ED. For example, the error detection signal ED may be included in a most significant bit (MSB) of the second command CMD2 213 but the embodiments are not limited thereto. The non-volatile memory 200 may determine whether a communication error has occurred in the first command CMD1 211 and the address 212, based on the error detection signal ED. When it is determined that the communication error has not occurred in the first command CMD1 211 and the address 212, the non-volatile memory 200 may perform a read operation and transmit read data R-DATA to the storage controller 100.

Specifically, the non-volatile memory 200 may perform the read operation for a read operation time $t_R$ after a first time $t_{WB}$ starting from the transmission of the second command CMD2 213. The non-volatile memory 200 may transmit the read data R-DATA to the storage controller 100 through a plurality of data signal lines after a second time $t_{RR}$ starting from the end of the read operation time $t_R$. For example, the first time $t_{WB}$ may correspond to an enable section of a write enable signal, and the second time $t_{RR}$ may correspond to an enable section of a read enable signal.

Referring to FIGS. 1 and 2B, the non-volatile memory 200 may determine whether a communication error has occurred in a first command CMD1 211 and an address 212, based on an error detection signal ED. When it is determined that a communication error has occurred in the first command CMD1 211 and the address 212, the non-volatile memory 200 may generate an error message E and transmit the error message E to the storage controller 100 through a plurality of data signal lines. The storage controller 100 may sequentially transmit a first command CMD1 214, an address 215, and a second command CMD2 216 to the non-volatile memory 200 through the plurality of data signal lines, in response to the error message E. For example, the first command CMD1 214, the address 215, and the second command CMD2 216 may be substantially the same as the previously transmitted first command CMD1 211, address 212, and second command CMD2 213, but the embodiments are not limited thereto.

Figure 3:
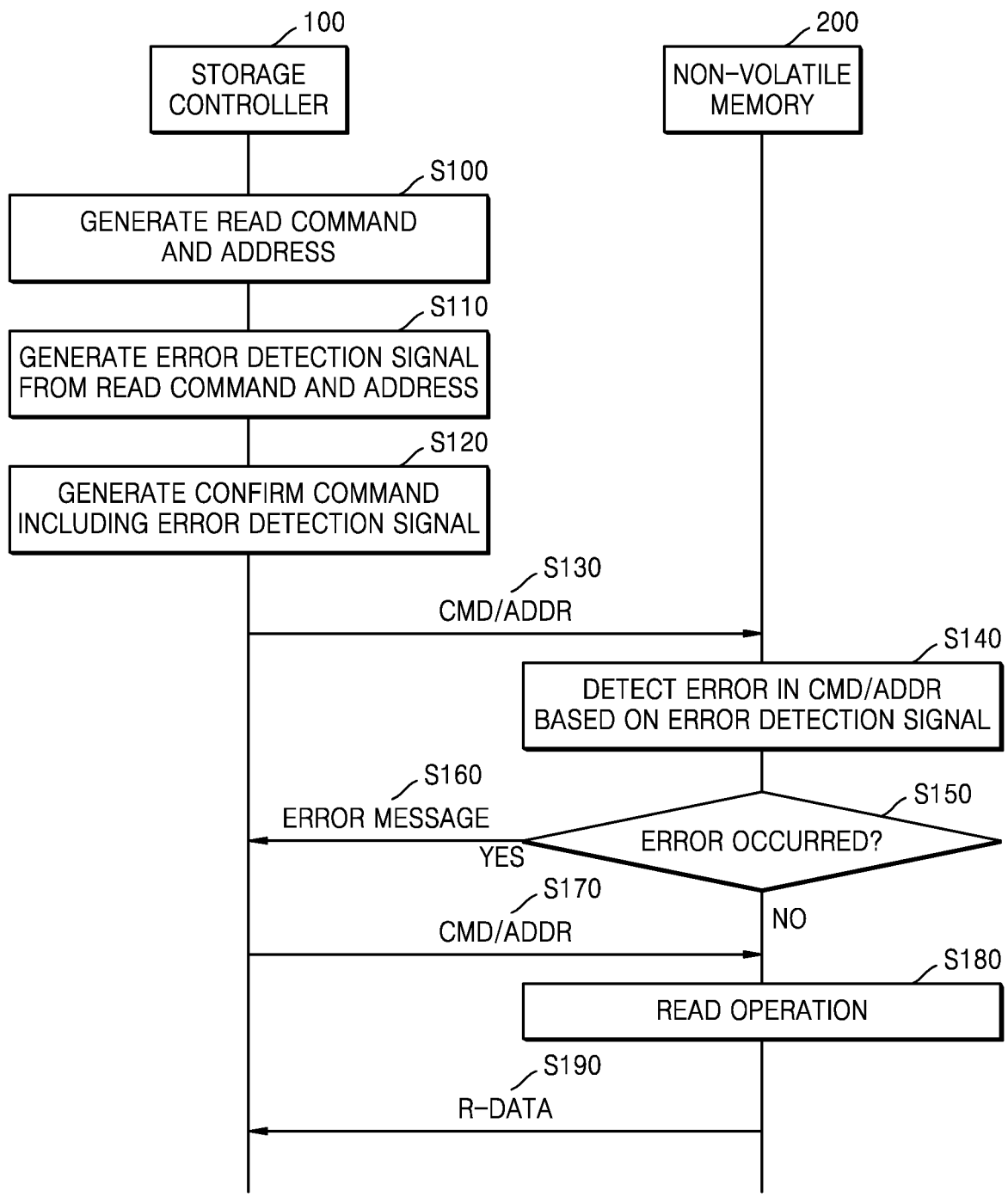
FIG. 3 illustrates a method of performing a read operation between a storage controller and a non-volatile memory according to an embodiment.

FIG. 3 illustrates a method of performing a read operation between a storage controller 100 and a non-volatile memory 200 according to an embodiment.

Referring to FIGS. 1 to 3, in operation S100, the storage controller 100 generates a read command and an address. For example, the read command may correspond to the first command CMD1 211 of FIGS. 2A and 2B, and the address may correspond to the address 212 of FIGS. 2A and 2B. In operation S110, the storage controller 100 generates an error detection signal ED from the read command and the address. In operation S120, the storage controller 100 generates a confirm command including the error detection signal ED. For example, the confirm command may correspond to the second command CMD2 213 of FIGS. 2A and 2B.

In operation S130, the storage controller 100 transmits a command/address CMD/ADDR to the non-volatile memory 200 through a plurality of data signal lines. For example, the command/address CMD/ADDR may include the read command, the address, and the confirm command, and the read command, the address, and the confirm command may be sequentially transmitted to the non-volatile memory 200 through the plurality of data signal lines.

In operation S140, the non-volatile memory 200 detects a communication error in the command/address CMD/ADDR, based on the error detection signal ED. Here, the communication error in the command/address CMD/ADDR may be a communication error occurring during the transmission of the command/address CMD/ADDR. For example, the control logic circuitry 220 may detect a communication error in the command/address CMD/ADDR by performing a logic operation on the error detection signal ED.

In operation S150, the non-volatile memory 200 determines whether a communication error has occurred in the command/address CMD/ADDR. When it is determined that a communication error has occurred in the command/address CMD/ADDR (operation S150, YES), in operation S160, the non-volatile memory 200 transmits an error message E to the storage controller 100. For example, the error message E may be transmitted to the storage controller 100 through plurality of data signal lines. On the other hand, when it is determined that a communication error has not occurred in the command/address CMD/ADDR (operation S150, NO), operation proceeds to operation S180 described below.

Upon receiving the error message in operation S160, the storage controller 100 transmits the command/address CMD/ADDR again to the non-volatile memory 200 through the plurality of data signal lines in operation S170, and then S180 may be performed. For example, in operation S170, the command/address CMD/ADDR may include the read command, the address, and the confirm command, and the read command, the address, and the confirm command may be sequentially transmitted to the non-volatile memory 200 through the plurality of data signal lines. For example, the read command, the address, and the confirm command may correspond to the first command CMD1 214, the address 215, and the second command CMD2 216 of FIG. 2B, respectively.

In operation S180, the non-volatile memory 200 performs a read operation according to the command/address CMD/ADDR. Specifically, the control logic circuitry 220 may read data stored in the memory cell array 210 according to the command/address CMD/ADDR for a read operation time $t_R$. In operation S190, the non-volatile memory 200 transmits read data R-DATA to the storage controller 100 through the plurality of data signal lines.

Figure 4A:
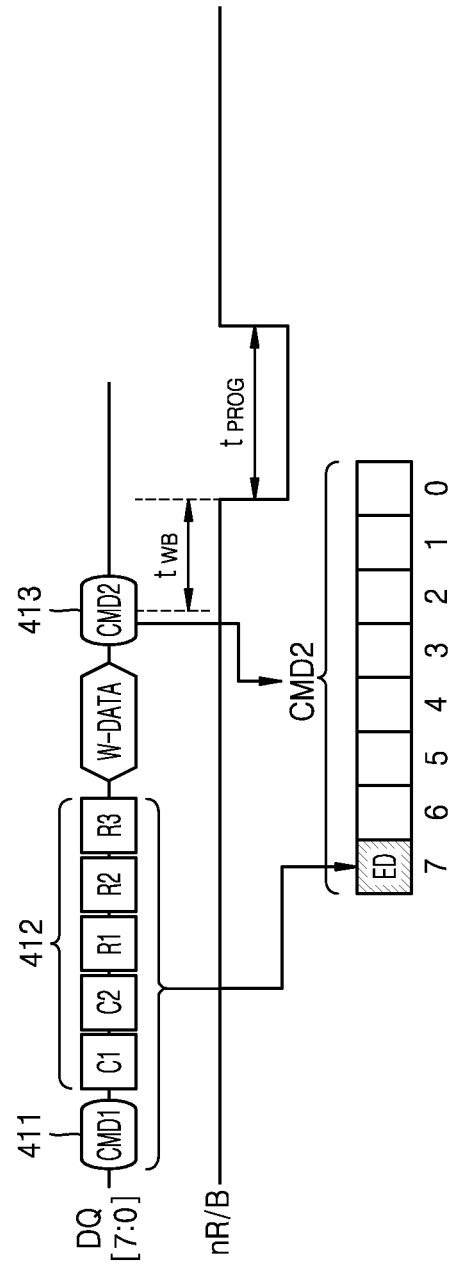
FIGS. 4A and 4B are timing diagrams illustrating communication between a storage controller and a non-volatile memory during a write operation of the non-volatile memory according to an embodiment.
Figure 4B:
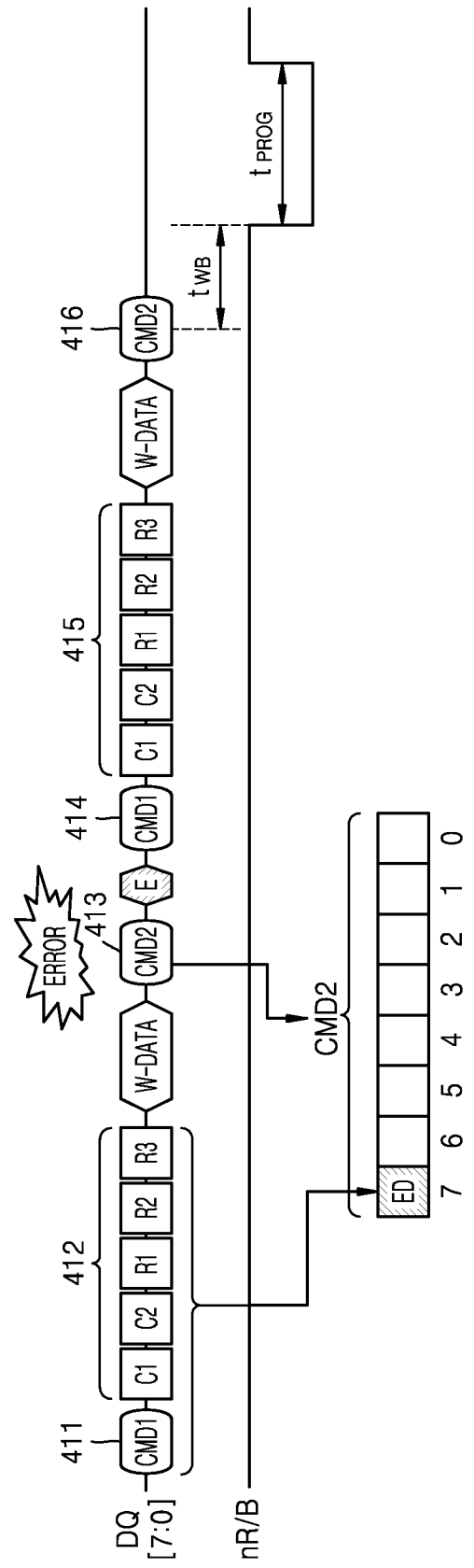

FIGS. 4A and 4B are timing diagrams illustrating communication between the storage controller 100 and the non-volatile memory 200 during a write operation of the non-volatile memory 200 according to an embodiment.

Referring to FIGS. 1 and 4A, the storage controller 100 may sequentially transmit a first command CMD1 411, an address 412, write data W-DATA, and a second command CMD2 413 to the non-volatile memory 200 through a plurality of data signal lines. The first command CMD1 411 may include an input command (e.g., 80$h$) indicating that the type of a memory operation is a write operation, and the address 412 may include first and second column addresses C1 and C2 and first to third row addresses R1, R2 and R3. The second command CMD2 413 may be a confirm command (e.g., 10$h$) instructing a write operation.

In an embodiment, the error detection module 120 may generate an error detection signal ED from the first command CMD1 411 and the address 412, and the command and address generator 110 may generate the second command CMD2 413 such that a reserved bit of the second command CMD2 413 includes the error detection signal ED. For example, the error detection signal ED may be included in an MSB of the second command CMD2 413 but the embodiments are not limited thereto. The non-volatile memory 200 may determine whether a communication error has occurred in the first command CMD1 411 and the address 412, based on the error detection signal ED. When it is determined that a communication error has not occurred in the first command CMD1 411 and the address 412, the non-volatile memory 200 may perform the write operation.

Specifically, the non-volatile memory 200 may perform the write operation for a program operation time $t_{ROG}$ after a first time $t_{WB}$ starting from the transmission of the second command CMD2 413. For example, the first time $t_{WB}$ may correspond to an enable section of a write enable signal. After the end of the program operation time $t_{PROG}$, the non-volatile memory 200 may transmit a response message indicating that the write operation is completed to the storage controller 100 through the plurality of data signal lines.

Referring to FIGS. 1 and 4B, the non-volatile memory 200 may determine whether a communication error has occurred in a first command CMD1 411 and an address 412, based on an error detection signal ED. When it is determined that a communication error has occurred in the first command CMD1 411 and the address 412, the non-volatile memory 200 may generate an error message E and transmit the error message E to the storage controller 100 through a plurality of data signal lines. The storage controller 100 may sequentially transmit a first command CMD1 414, an address 415, write data W-DATA, and a second command CMD2 416 to the non-volatile memory 200 through the plurality of data signal lines, in response to the error message E. For example, the first command CMD1 414, the address 415, the write data W-DATA, and the second command CMD2 416 may be substantially the same as the previously transmitted first command CMD1 411, address 412, write data W-DATA, and second command CMD2 413, but the embodiments are not limited thereto. In some embodiments, the storage controller 100 may sequentially transmit the first command CMD1 414, the address 415, and the second command CMD2 416 to the non-volatile memory 200 through the plurality of data signal lines, in response to the error message E. In other words, in some embodiments, the write data W-DATA may not be transmitted again.

Figure 5:
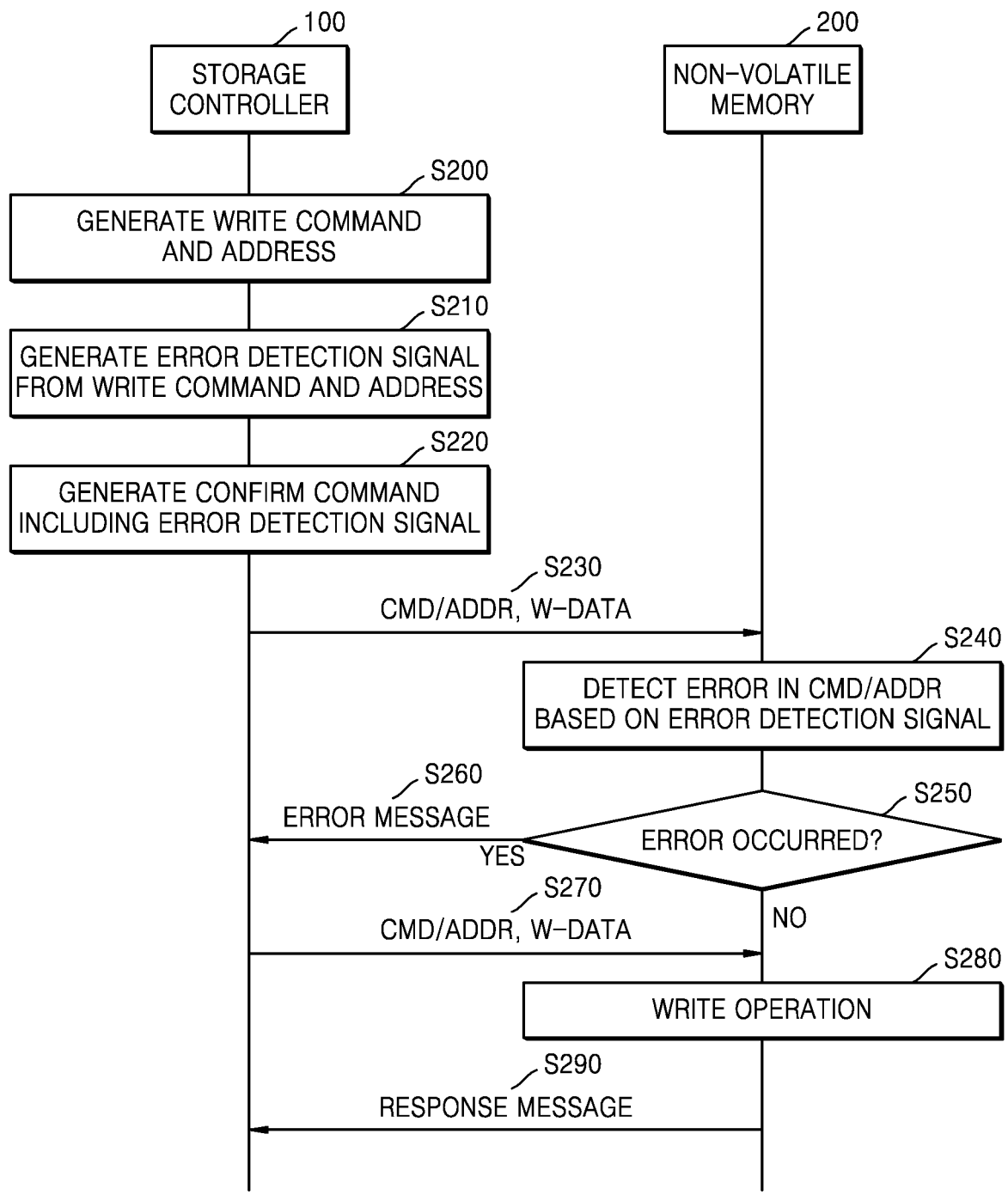
FIG. 5 illustrates a method of performing a write operation between a storage controller and a non-volatile memory according to an embodiment.

FIG. 5 illustrates a method of performing a write operation between a storage controller 100 and a non-volatile memory 200 according to an embodiment.

Referring to FIGS. 1, 4A, 4B and 5, in operation S200, the storage controller 100 generates a write command and an address. For example, the write command may correspond to the first command CMD1 411 of FIGS. 4A and 4B, and the address may correspond to the address 412 of FIGS. 4A and 4B. In operation S210, the storage controller 100 generates an error detection signal ED from the write command and the address. In operation S220, the storage controller 100 generates a confirm command including the error detection signal ED. For example, the confirm command may correspond to the second command CMD2 413 of FIGS. 4A and 4B.

In operation S230, the storage controller 100 transmits a command/address CMD/ADDR and write data W-DATA to the non-volatile memory 200 through a plurality of data signal lines. For example, the command/address CMD/ADDR may include the write command, the address, and the confirm command, and the write command, the address, the write data W-DATA and the confirm command may be sequentially transmitted to the non-volatile memory 200 through the plurality of data signal lines.

In operation S240, the non-volatile memory 200 detects a communication error in the command/address CMD/ADDR, based on the error detection signal ED. For example, the communication error in the command/address CMD/ADDR may be a communication error occurring during the transmission of the command/address CMD/ADDR. For example, the control logic circuitry 220 may detect a communication error in the command/address CMD/ADDR by performing a logic operation on the error detection signal ED.

In operation S250, the non-volatile memory 200 determines whether a communication error has occurred in the command/address CMD/ADDR. When it is determined that a communication error has occurred in the command/address CMD/ADDR (operation S250, YES), in operation S260, the non-volatile memory 200 transmits an error message E to the storage controller 100. For example, the error message E may be transmitted to the storage controller 100 through plurality of data signal lines. On the other hand, when it is determined that a communication error has not occurred in the command/address CMD/ADDR (operation S250, NO), operation proceeds to operation S280 described below.

Upon receiving the error message in operation S260, the storage controller 100 transmits the command/address CMD/ADDR and the write data W-DATA again to the non-volatile memory 200 through the plurality of data signal lines in operation S270, and then S280 may be performed. For example, in operation S270, the command/address CMD/ADDR may include the write command, the address, and the confirm command, and the write command, the address, and the confirm command may be sequentially transmitted to the non-volatile memory 200 through the plurality of data signal lines. For example, the write command, the address, and the confirm command may correspond to the first command CMD1 414, the address 415, and the second command CMD2 416 of FIG. 4B, respectively. However, as discussed above, in some embodiments, the write data W-DATA may not be transmitted again.

In operation S280, the non-volatile memory 200 performs a write operation according to the command/address CMD/ADDR. Specifically, the control logic circuitry 220 may write data to the memory cell array 210 according to the command/address CMD/ADDR for a program operation time $t_{PROG}$. In operation S290, the non-volatile memory 200 transmits a response message indicating the completion of the write operation to the storage controller 100 through the plurality of data signal lines.

Figure 6:
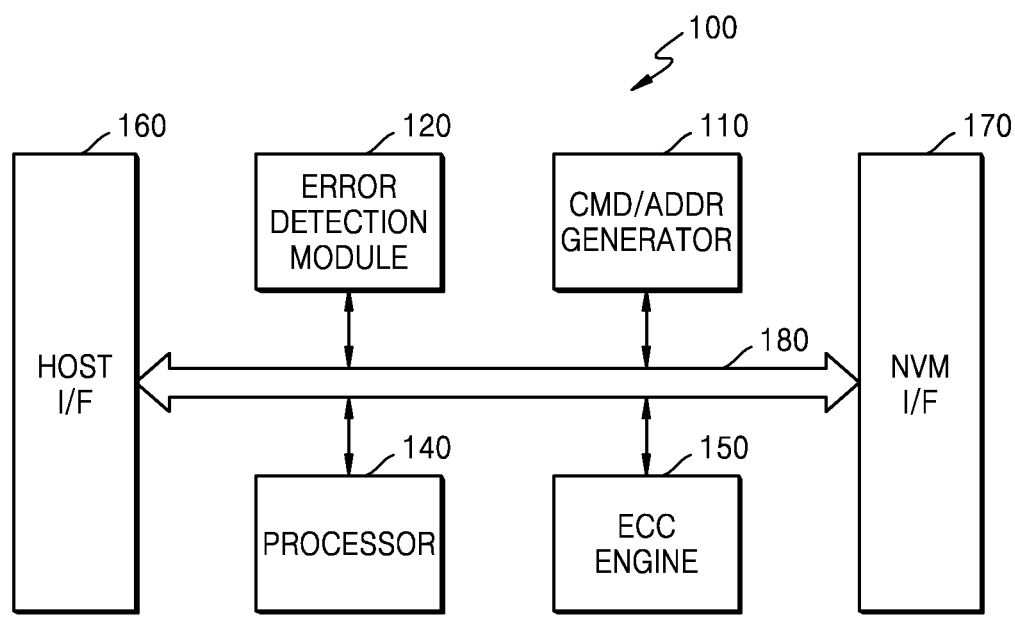
FIG. 6 is a detailed block diagram of a storage controller according to an embodiment.

FIG. 6 is a detailed block diagram of a storage controller 100 according to an embodiment.

Referring to FIGS. 1 and 6, the storage controller 100 may include a command and address generator 110, an error detection module 120, a processor 140, an error correction code (ECC) engine 150, a host interface (I/F) 160, and a non-volatile memory interface (NVM I/F) 170, which may communicate with one another via a bus 180. The processor 140 may include a Central Processing Unit (CPU), a microprocessor, and the like, and control overall operations of the storage controller 100. In an embodiment, the processor 140 may be embodied as a multi-core processor, for example, a dual-core processor or a quad-core processor.

In an embodiment, the command and address generator 110 and the error detection module 120 may be implemented by software. For example, the non-volatile memory 200 may store program code for generating a command/address, and when power is applied to the storage device 10, the program code stored in the non-volatile memory 200 may be loaded to an operating memory of the storage controller 100. The processor 140 may execute the program code loaded to the operating memory to generate an error detection signal ED and a command/address CMD/ADDR as described above with reference to FIGS. 1 to 5. However, the embodiments are not limited thereto, and in some embodiments, the command and address generator 110 and the error detection module 120 may be implemented by hardware. In other embodiments, the command and address generator 110 and the error detection module 120 may be embodied as a combination of software and hardware.

In FIG. 6, the command and address generator 110 and the error detection module 120 are illustrated as functional blocks different from the non-volatile memory interface (NVM I/F) 170 but the embodiments are not limited thereto. In various embodiments, at least one of the command and address generator 110 and the error detection module 120 may be included in the non-volatile memory interface (NVM I/F) 170.

The host interface (I/F) 160 may transmit a packet to or receive a packet from a host (see also FIG. 1). The packet transmitted from the host to the host interface (I/F) 160 may include a command, data to be written to the non-volatile memory 200, or the like, and the packet transmitted from the host interface (I/F) 160 to the host may include a response to the command, data read from the non-volatile memory 200, or the like. The non-volatile memory interface (NVM I/F) 170 may transmit data, which is to be written to the non-volatile memory 200, i.e., write data (e.g., W-DATA in FIGS. 4A and 4B), to the non-volatile memory 200 or receive data read from the non-volatile memory 200, i.e., read data (e.g., R-DATA of FIGS. 2A and 2B). The non-volatile memory interface (NVM I/F) 170 may be implemented to comply with standards such as Toggle or Open NAND Flash Interface (ONFI).

The ECC engine 150 may perform an error detection and correction function on read data read from the non-volatile memory 200. More specifically, the ECC engine 150 may generate parity bits with respect to write data to be written to the non-volatile memory 200, and the generated parity bits may be stored in the non-volatile memory 200, together with the write data. When data is read from the non-volatile memory 200, the ECC engine 150 may correct an error in the read data by using the parity bits read from the non-volatile memory 200 together with the read data, and output the error-corrected read data. As described above, the ECC engine 150 may perform the error detection and correction function on data, and the error detection module 120 may perform an error detection function on a command/address. According to an embodiment, the error detection module 120 may perform an error detection and correction function on the command/address.

Although not shown, the storage controller 100 may further include a flash translation layer (FTL), a packet manager, a buffer memory, and an advanced encryption standard (AES) engine. The storage controller 100 may further include a working memory into which the FTL is loaded, and the processor 140 may execute the FTL to control a data write/read operation of the non-volatile memory 200.

Figure 7:
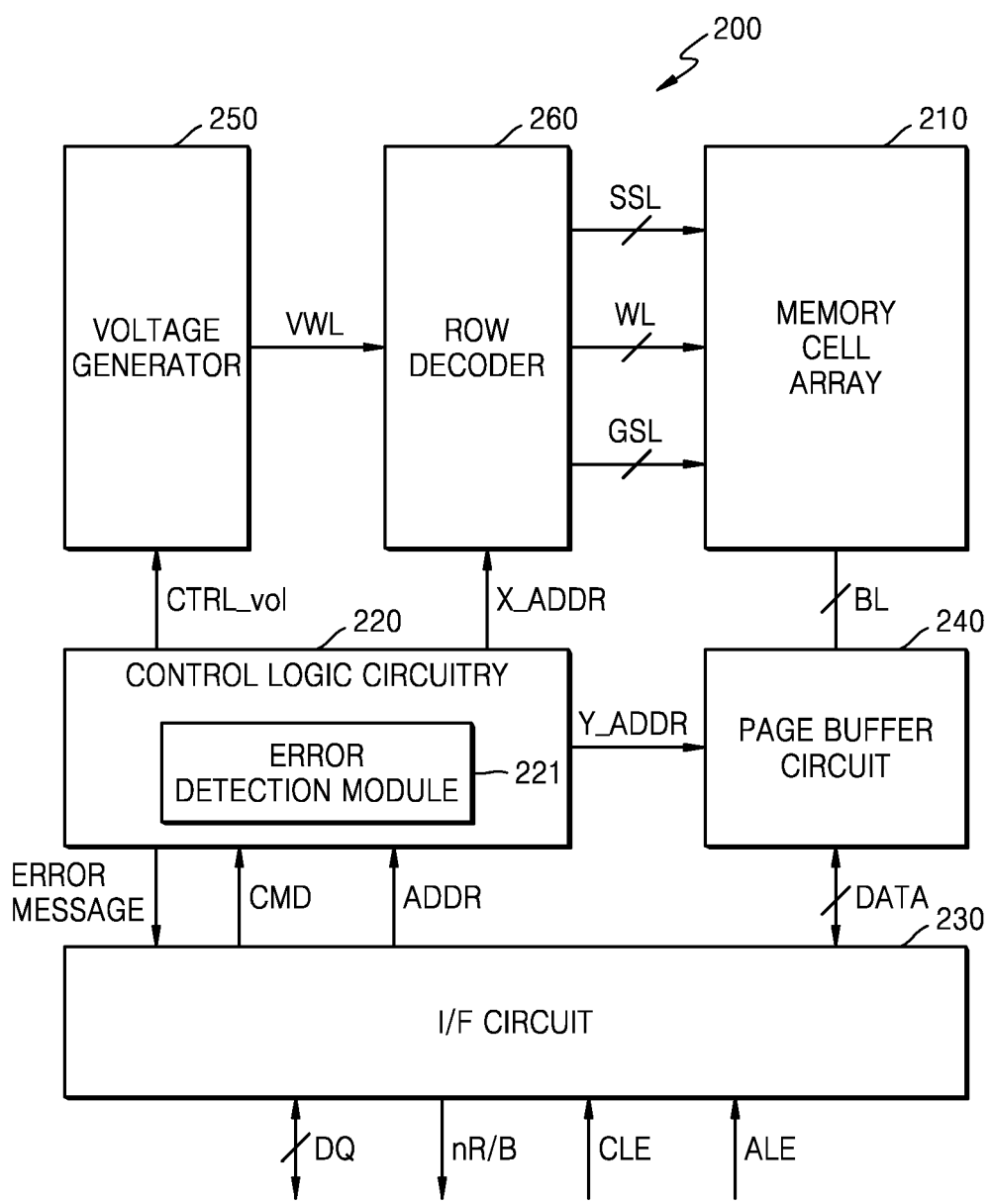
FIG. 7 is a detailed block diagram of a non-volatile memory according to an embodiment.

FIG. 7 is a detailed block diagram of a non-volatile memory 200 according to an embodiment.

Referring to FIGS. 1 and 7, the non-volatile memory 200 may include a memory cell array 210, control logic circuitry 220, an interface (I/F) circuit 230, a page buffer circuit 240, a voltage generator 250, and a row decoder 260. The interface (I/F) circuit 230 may receive a plurality of data signals DQ, a command latch enable signal CLE, and an address latch enable signal ALE from the storage controller 100, and transmit a ready/busy output signal nR/B to the storage controller 100. For example, the interface (I/F) circuit 230 may include a plurality of drivers and a plurality of receivers.

The interface (I/F) circuit 230 may determine that a plurality of data signals DQ include a command CMD, an address ADDR or data DATA, based on the command latch enable signal CLE and the address latch enable signal ALE. When the plurality of data signals DQ include the command CMD or the address ADDR, the interface (I/F) circuit 230 may provide the command CMD or the address ADDR to the control logic circuitry 220. When the plurality of data signals DQ include the data DATA, the interface (I/F) circuit 230 may provide the data DATA to the page buffer circuit 240.

The control logic circuitry 220 may generally control various operations of the non-volatile memory 200. The control logic circuitry 220 may output various control signals in response to the command CMD and/or the address ADDR from the interface (I/F) circuit 230. For example, the control logic circuitry 220 may output a voltage control signal CTRL_vol, a row address X-ADDR, and a column address Y-ADDR.

The control logic circuitry 220 may include an error detection module 221, and the error detection module 221 may detect a communication error in the command CMD and the address ADDR. Specifically, the error detection module 221 may detect a communication error in the command CMD and the address ADDR by performing a logic operation on an error detection signal ED included in the command CMD. When a communication error is detected, the control logic circuitry 220 may generate an error message and provide the generated error message to the interface (I/F) circuit 230. The interface (I/F) circuit 230 may provide the storage controller 100 with a plurality of data signals DQ including the error message. When a communication error is not detected, the control logic circuitry 220 may control the page buffer circuit 240, the voltage generator 250, and the row decoder 260 to perform a memory operation according to the command CMD and the address ADDR.

The memory cell array 210 may be connected to the page buffer circuit 240 through bit lines BL and be connected to the row decoder 460 through word lines WL, string selection lines SSL, and ground selection lines GSL. In an embodiment, the memory cell array 210 may include a three-dimensional (3D) memory cell array, and the 3D memory cell array may include a plurality of NAND strings. Each of the NAND strings may include memory cells connected to word lines vertically stacked on a substrate. U.S. Pat. Nos. 7,679,133, 8,553,466, 8,654,587, 8,559,235, and U.S. Patent Application Publication No. 2011/0233648 describe various structures related to memory cell arrays and are incorporated by reference herein in their entireties. In an embodiment, the memory cell array 210 may include a two-dimensional (2D) memory cell array, and the 2D memory cell array may include a plurality of NAND strings arranged in row and column directions.

The page buffer circuit 240 may select at least one of the bit lines BL in response to the column address Y-ADDR. The page buffer circuit 240 may function as a write driver or a sense amplifier according to an operating mode. For example, during a program operation, the page buffer circuit 240 may apply a bit line voltage corresponding to data to be programmed to the selected bit line. During a read operation, the page buffer circuit 240 may sense data stored in a memory cell by sensing a current or voltage of the selected bit line.

The voltage generator 250 may generate various types of voltages for performing the program operation, the read operation, an erase operation, etc., based on the voltage control signal CTRL_vol. For example, the voltage generator 250 may generate a program voltage, a read voltage, a program-verify voltage, an erase voltage, or the like as a word line voltage VWL. The row decoder 260 may select one of the word lines WL and one of the string selection lines SSL in response to the row address X-ADDR. For example, the row decoder 260 may apply the program voltage and the program-verify voltage to the selected word line during the program operation and may apply the read voltage to the selected word line during the read operation.

Figure 8:
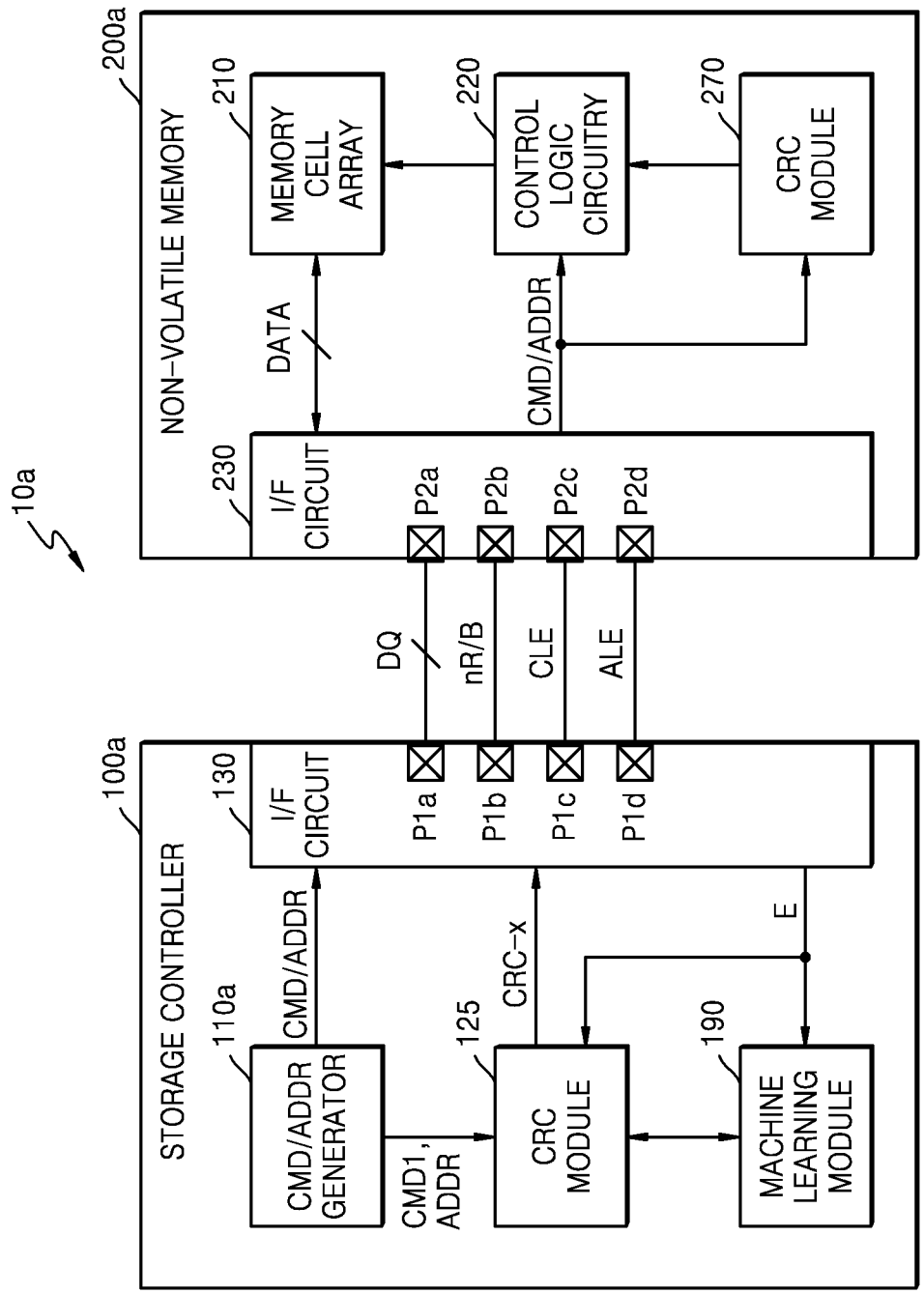
FIG. 8 is a block diagram of a storage device according to an embodiment.

FIG. 8 is a block diagram of a storage device 10a according to an embodiment.

Referring to FIG. 8, the storage device 10a may include a storage controller 100a and a non-volatile memory 200a. The storage device 10a may correspond to a modified example of the storage device 10 of FIG. 1, and the above description of FIGS. 1 to 7 may also apply to the embodiment of FIG. 8. Thus, a redundant description thereof is omitted for conciseness.

A command and address generator 110a may generate a command/address CMD/ADDR to control the non-volatile memory 200a. In an embodiment, the command/address CMD/ADDR may be a command set including a first command CMD1, an address ADDR, and a second command (e.g., CMD2 in FIG. 2A) that are sequentially transmitted to the non-volatile memory 200a.

A cyclic redundancy check (CRC) module 125 may generate a CRC value CRC-x by performing CRC on the first command CMD1 and the address ADDR. Specifically, the CRC module 125 may calculate a check value, e.g., the CRC value CRC-x, for verifying whether there is an error in the command/address CMD/ADDR when the command/address CMD/ADDR is to be transmitted through a plurality of data signal lines. The CRC value CRC-x may be transmitted to the non-volatile memory 200a via the first pins P1a. Here, x may be a positive integer determined according to the size of the generated CRC value. For example, when the CRC module 125 performs CRC-16 logic, x may be 16 and the CRC value CRC-16 may be generated as a 16-bit signal. For example, when the CRC module 125 performs CRC-8 logic, x may be 8 and the CRC value CRC-8 may be generated as an 8-bit signal.

The CRC module 125 may calculate the CRC value CRC-x according to the command/address CMD/ADDR before the transmission of the command/address CMD/ADDR and transmit the CRC value CRC-x to the non-volatile memory 200a together with the command/address CMD/ADDR. In an embodiment, after the transmission of the command/address CMD/ADDR, the CRC module 125 may calculate a CRC value CRC-x according to a received command/address CMD/ADDR, and determine that an error has been added due to noise or the like during the transmission of the command/address CMD/ADDR when the two CRC values CRC-x are different from each other. In an embodiment, when an error message E is received from the non-volatile memory 200a, the CRC module 125 may determine that an error is also transmitted due to noise or the like during the transmission of the command CMD/address ADD.

A machine learning module 190 may predict the occurrence of a communication error in the command/address CMD/ADDR according to a reliability probability level. Specifically, the machine learning module 190 may compare the sum of a communication error rate $E_S$ (that is, an actual error incidence rate in the command/address CMD/ADDR) and a determination error rate $M_E$ determined by machine learning, with a reference value $B_C$, and apply a result of the comparison to a machine learning determinations system during the transmission of the command/address CMD/ADDR.

When it is predicted that a communication error in the command CMD/address ADD will occur, the machine learning module 190 may enable the CRC module 125 and thus the CRC module 125 may calculate the CRC value CRC-x from the first command CMD1 and the address ADDR and the storage controller 100a may transmit the CRC value CRC-x to the non-volatile memory 200a together with the command CMD/address ADD. When it is predicted that the command CMD/address ADD will not occur, the machine learning module 190 may disable the CRC module 125 and thus the storage controller 100A may transmit only the command CMD/address ADD to the non-volatile memory 200a and the CRC value CRC-x may not be transmitted to the non-volatile memory 200a.

As described above, according to the embodiment of FIG. 8, the storage controller 100a may predict a communication error in the command CMD/address ADD by using the machine learning module 190, and generate an error detection signal (e.g., the CRC value) only when it is predicted that a communication error will occur and transmit the error detection signal (the CRC value) to the non-volatile memory 200a. Accordingly, the storage controller 100a may reduce performance degradation caused by the generation and transmission of the error detection signal.

Figure 9A:
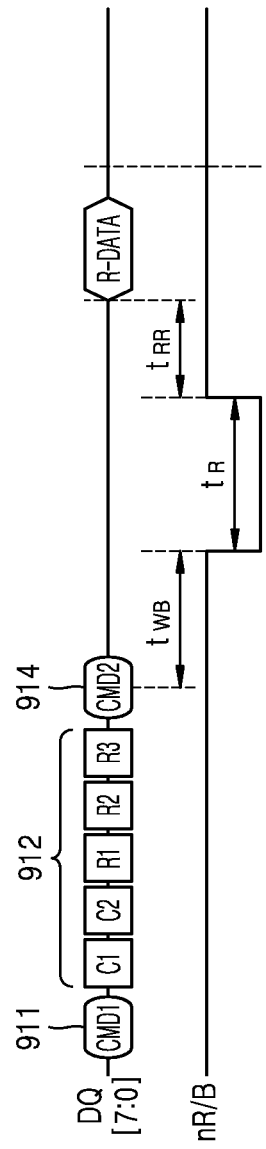
FIGS. 9A to 9C are timing diagrams illustrating communication between a storage controller and a non-volatile memory during a read operation of the non-volatile memory according to an embodiment.
Figure 9B:
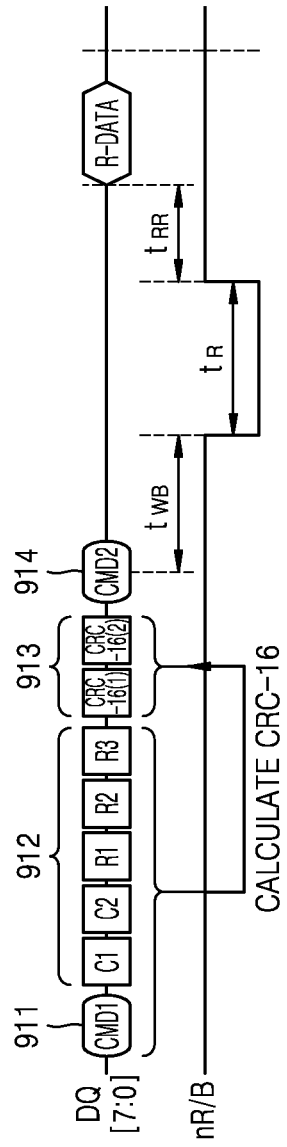
Figure 9C:
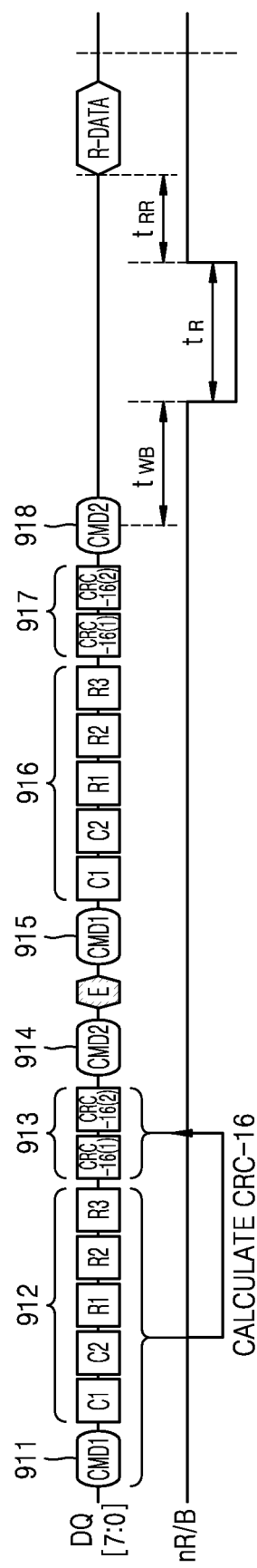

FIGS. 9A to 9C are timing diagrams illustrating communication between the storage controller 100a and the non-volatile memory 200a of FIG. 8 during a read operation of the non-volatile memory 200a according to an embodiment. Communication between the storage controller 100a and the non-volatile memory 200a according to the embodiment illustrated in FIGS. 9A-9C may correspond to a modified example of the communication between the storage controller 100 and the non-volatile memory 200 illustrated in FIGS. 2A and 2B and thus the above description of FIGS. 2A and 2B may apply to the embodiment of FIGS. 9A-9C and therefore a repeated description may be omitted for conciseness.

Referring to FIGS. 8 and 9A, the machine learning module 190 may predict that a communication error in the command/address CMD/ADDR will not occur. In this case, the machine learning module 190 may disable the CRC module 125 and thus the CRC module 125 may not calculate CRC values. The storage controller 100a may sequentially transmit a first command CMD1 911, an address 912, and a second command CMD2 914 to the non-volatile memory 200a through a plurality of data signal lines. For example, the first command CMD1 911 and the address 912 may correspond to the first command CMD1 211 and the address 212 of FIG. 2A, respectively. For example, the second command CMD2 914 may be a confirm command indicating the size of a page to be read and may not include an error detection signal. For example, the second command CMD2 914 may include 50 h, 20 h or 30 h. The non-volatile memory 200a may perform a read operation and transmit read data R-DATA to the storage controller 100a.

Referring to FIGS. 8 and 9B, the machine learning module 190 may predict that a communication error in the command/address CMD/ADDR will occur. In this case, the machine learning module 190 may enable the CRC module 125, and thus the CRC module 125 may calculate CRC values 913 from a first command CMD1 911 and an address 912 and the storage controller 100a may sequentially transmit the first command CMD1 911, the address 912, the CRC values 913, and a second command CMD2 914 to the non-volatile memory 200a through the plurality of data signal lines.

The CRC values 913 may correspond to the CRC value CRC-x generated by the CRC module 125. For example, the CRC module 125 may calculate CRC-16(1) and CRC-16(2) by performing CRC on the first command CMD1 911 and the address 912 by applying a CRC-16 error detection logic, and the CRC-16(1) may be provided as an 8-bit signal and the CRC-16(2) may be provided as an 8-bit signal. The non-volatile memory 200a may determine whether a communication error has occurred in the first command CMD1 911 and the address 912, based on the CRC values 913. When it is determined that a communication error has not occurred in the first command CMD1 911 and the address 912, the non-volatile memory 200a may perform a read operation and transmit read data R-DATA to the storage controller 100a.

Referring to FIGS. 8 and 9C, the non-volatile memory 200a may determine whether a communication error has occurred in a first command CMD1 911 and an address 912, based on CRC values 913. When it is determined that a communication error has occurred in the first command CMD1 911 and the address 912, an error message E may be generated and transmitted to the storage controller 100a through a plurality of data signal lines. The storage controller 100a may sequentially transmit a first command CMD1 915, an address 916, CRC values 917 and a second command CMD2 918 to the non-volatile memory 200a through the plurality of data signal lines, in response to the error message E. For example, the first command CMD1 915, the address 916, the CRC values 917, and the second command CMD2 918 may be substantially the same as the previously transmitted first command CMD1 911, address 912, CRC values 913, and second command CMD2 914, but the embodiments are not limited thereto.

Figure 10A:
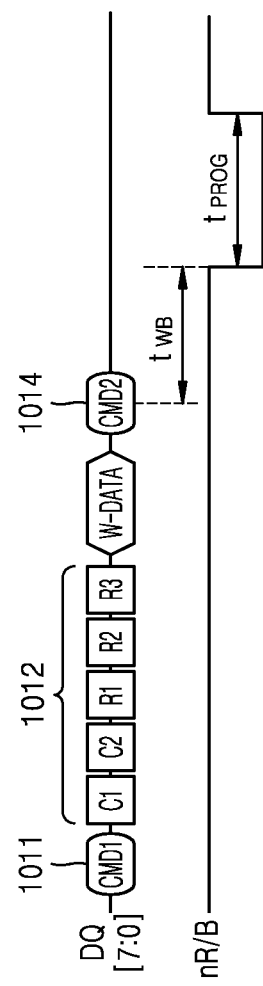
FIGS. 10A to 10C are timing diagrams illustrating communication between a storage controller and a non-volatile memory during a read operation of the non-volatile memory according to an embodiment.
Figure 10B:
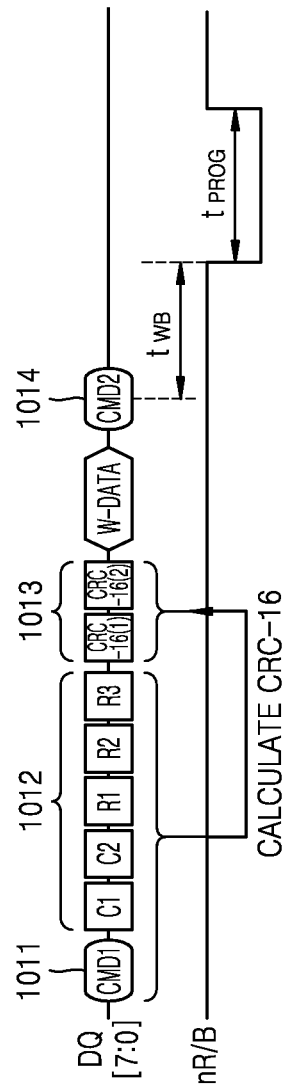
Figure 10C:
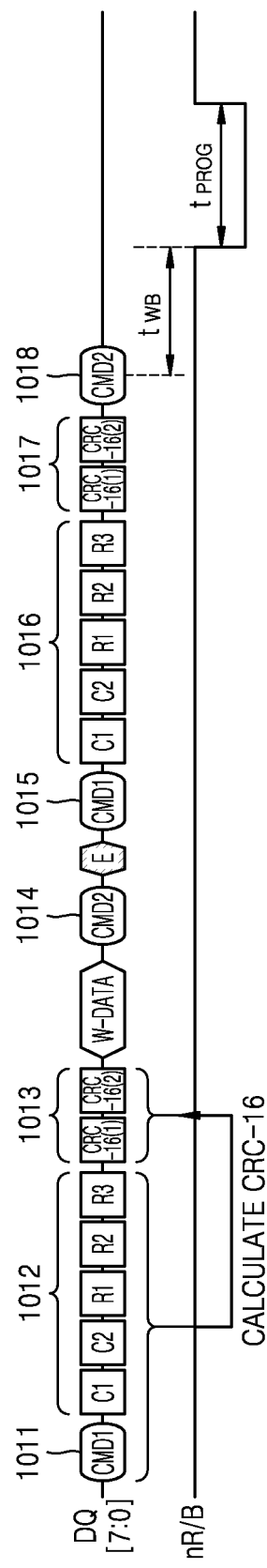

FIGS. 10A to 10C are timing diagrams illustrating communication between the storage controller 100a and the non-volatile memory 200a during a read operation of the non-volatile memory 200a according to an embodiment. Communication between the storage controller 100a and the non-volatile memory 200a according to the embodiment of FIGS. 10A-10C may correspond to a modified example of the communication between the storage controller 100 and the non-volatile memory 200 illustrated in FIGS. 4A and 4B and thus the above description of FIGS. 4A and 4B may apply to the embodiment of FIGS. 10A-10C and therefore repeated description may be omitted for conciseness.

Referring to FIGS. 8 and 10A, the machine learning module 190 may predict that a communication error in the command/address CMD/ADDR will not occur. In this case, the machine learning module 190 may disable the CRC module 125 and thus the CRC module 125 may not calculate CRC values. The storage controller 100a may sequentially transmit a first command CMD1 1011, an address 1012, write data W-DATA, and a second command CMD2 1014 to the non-volatile memory 200a through a plurality of data signal lines. For example, the first command CMD1 1011 and the address 1012 may correspond to the first command CMD1 411 and the address 412 of FIG. 4A, respectively. For example, the second command CMD2 1014 may be a confirm command (e.g., 10 h) instructing a write operation (e.g., 10 h) and may not include an error detection signal. The non-volatile memory 200a may write the write data W-DATA and transmit a response message indicating completion of the writing of the write data W-DATA to the storage controller 100a through the plurality of data signal lines when the writing of the write data W-DATA is completed.

Referring to FIGS. 8 and 10B, the machine learning module 190 may predict that a communication error in the command/address CMD/ADDR will occur. In this case, the machine learning module 190 may enable the CRC module 125, and thus the CRC module 125 may calculate CRC values 1013 from the first command CMD1 1011 and the address 1012 and the storage controller 100a may sequentially transmit the first command CMD1 1011, the address 1012, the CRC values 1013, write data W-DATA, and a second command CMD2 1014 to the non-volatile memory 200a through the plurality of data signal lines.

The CRC values 1013 may correspond to the CRC value CRC-x generated by the CRC module 125. For example, the CRC module 125 may calculate CRC-16(1) and CRC-16(2) by performing CRC on the first command CMD1 1011 and the address 1012 by applying a CRC-16 error detection logic, and the CRC-16(1) may be provided as an 8-bit signal and the CRC-16(2) may be provided as an 8-bit signal. The non-volatile memory 200a may determine whether a communication error has occurred in the first command CMD1 1011 and the address 1012, based on the CRC values 1013. When it is determined that a communication error has not occurred in the first command CMD1 1011 and the address 1012, the non-volatile memory 200a may write the write data W-DATA.

Referring to FIGS. 8 and 10C, the non-volatile memory 200a may determine whether a communication error has occurred in a first command CMD1 1011 and an address 1012, based on CRC values 1013. When it is determined that a communication error has occurred in the first command CMD1 1011 and the address 1012, an error message E may be generated and transmitted to the storage controller 100a through a plurality of data signal lines. The storage controller 100a may sequentially transmit a first command CMD1 1015, an address 1016, CRC values 1017 and a second command CMD2 1018 to the non-volatile memory 200a through the plurality of data signal lines, in response to the error message E. For example, the first command CMD1 1015, the address 1016, the CRC values 1017, and the second command CMD2 1018 may be substantially the same as the previously transmitted first command CMD1 1011, address 1012, CRC values 1013, and second command CMD2 1014, but the embodiments are not limited thereto.

Figure 11:
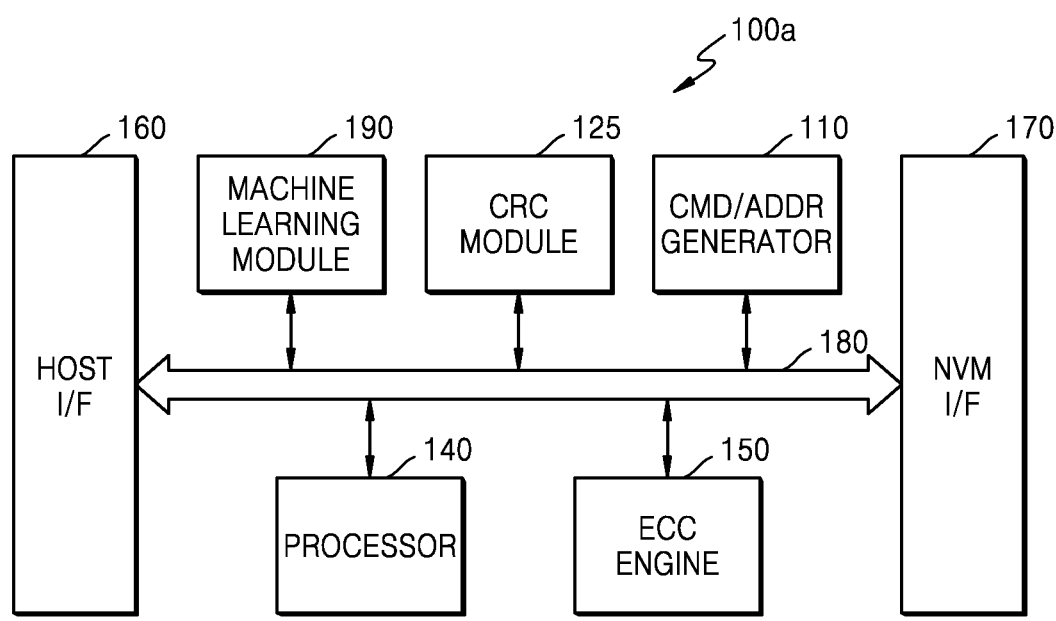
FIG. 11 is a detailed block diagram of a storage controller according to an embodiment.

FIG. 11 is a detailed block diagram of a storage controller 100a according to an embodiment.

Referring to FIGS. 8 and 11, the storage controller 100 may include a command and address generator 110, a CRC module 125, a processor 140, an ECC engine 150, a host interface (I/F) 160, a non-volatile memory interface (NVM I/F) 170, and a machine learning module 190, which may communicate with one another via a bus 180. The storage controller 100a may correspond to a modified example of the storage controller 100 of FIG. 6, and the above description of FIG. 6 may also apply to the embodiment of FIG. 11 and therefore repeated description may be omitted for conciseness.

In an embodiment, the CRC module 125 may be embodied as software. For example, the non-volatile memory 200a may store program code for performing CRC, and when power is applied to the storage device 10a, the program code stored in the non-volatile memory 200a may be loaded to an operating memory of the storage controller 100a. The processor 140 may execute the program code loaded to the operating memory to perform CRC on a command/address CMD/ADDR, thereby generating a CRC value CRC-x. However, the embodiments are not limited thereto, and in some embodiments, the CRC module 125 may be embodied as hardware. In other embodiments, the CRC module 125 may be embodied as a combination of software and hardware.

In an embodiment, the machine learning module 190 may be embodied as software. For example, the non-volatile memory 200a may store program code for performing machine learning, and when power is applied to the storage device 10a, the program code stored in the non-volatile memory 200a may be loaded to the operating memory of the storage controller 100a. The processor 140 may execute the program code loaded to the operating memory to predict the occurrence of a communication error during transmission of the command/address CMD/ADDR, and enable the CRC module 125 according to a result of the prediction. However, the embodiments are not limited thereto, and in some embodiments, the machine learning module 190 may be embodied as hardware. In other embodiments, the machine learning module 190 may be embodied as a combination of software and hardware.

Figure 12:
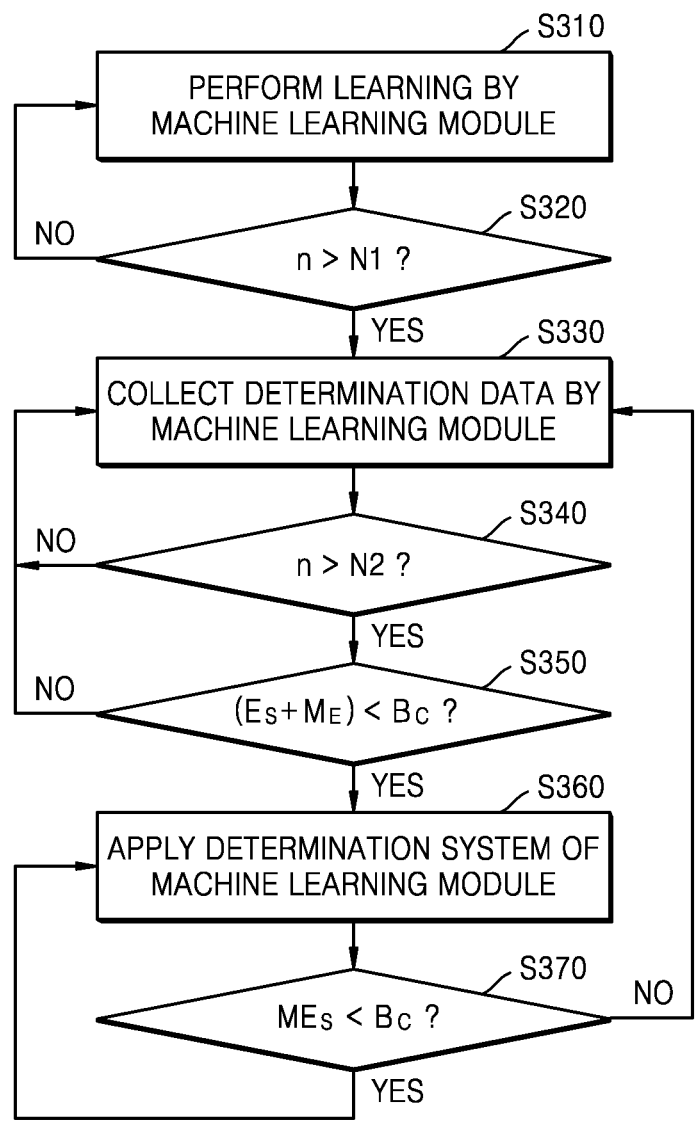
FIG. 12 is a flowchart of an operating method of a storage controller according to an embodiment.

FIG. 12 is a flowchart of an operating method of the storage controller 100a according to an embodiment.

Referring to FIG. 12, in operation S310, the machine learning module 190 of the storage controller 100a performs learning. Operation S310 may be performed when the command and address generator 110 of the storage controller 100a issues a command/address. Specifically, the machine learning module 190 may be trained with the command/address transmitted from the storage controller 100a to the non-volatile memory 200a and whether a communication error in the command/address has occurred.

In operation S320, it is determined whether the number n of times of processing the command/address is greater than a first reference value N1, i.e., n>N1. When it is determined that the number n of times of processing is greater than the first reference value N1 (operation S320, YES), operation S330 is performed, and when it is determined that the number n of times of processing is not greater than or is equal to the first reference value N1 (operation S320, NO), operation S310 is performed. Thus, the machine learning module 190 continuously performs learning until n>N1. For example, the first reference value N1 may be 1,000,000 but the embodiments are not limited thereto. The machine learning module 190 may perform learning in a first period, e.g., from a point in time when a first command/address is first transmitted to a point in time when a 1,000,000th command/address is transmitted for a 1,000,000th time. Therefore, the machine learning module 190 may calculate a communication error incidence rate, i.e., statistics, of the first to 1,000,000th commands/addresses. Operations S310 and S320 will be described in detail with reference to FIG. 13 below.

In operation S330, the machine learning module 190 collects determination data through machine learning by predicting whether a communication error in the command/address will occur. In this case, the machine learning module 190 may be continuously trained with the command/address transmitted from the storage controller 100a to the non-volatile memory 200a and whether a communication error in the command/address has occurred. In operation S340, it is determined whether the number n of times of processing the command/address is greater than a second reference value N2, i.e., n>N2. When it is determined that the number n of times of processing is greater than the second reference value N2 (operation S340, YES), operation S350 is performed, and when it is determined that the number n of times of processing is not greater than or is equal to the second reference value N2 (operation S340, NO), operation S330 is performed. Thus, the machine learning module 190 continuously performs learning until n>N2. For example, the second reference value N2 may be 2,000,000 but the embodiments are not limited thereto.

The machine learning module 190 may collect determination data through machine learning by predicting whether a communication error occurs in a second period, e.g., from a 1,000,001$^{st}$ command/address transmitted for a 1,000,001$^{st}$ time to a 2,000,000$^{th}$ command/address transmitted for a 2,000,000$^{th}$ time. Therefore, the machine learning module 190 may calculate a determination error rate by machine learning or a determination error rate $M_E$. For example, the determination error rate $M_E$ may be 0.000007.

In addition, the machine learning module 190 may continuously collect determination data through machine learning by predicting whether a communication error occurs in each of the 1,000,001-st command/address to the 2,000,000-th command/address. Therefore, the machine learning module 190 may calculate a communication error incidence rate $E_S$ for the first period and the second period, i.e., with respect to the first command/address to the 2,000,000-th command/address. In this case, the communication error incidence rate $E_S$ may correspond to statistics of actual communication error incidence rates. For example, the communication error incidence rate $E_S$ may be 0.000007. Operations S330 and S340 will be described in detail with reference to FIG. 14 below.

In operation S350, it is determined whether the sum of the communication error incidence rate $E_S$ and the determination error rate $M_E$ is less than a reference value $B_C$, i.e., $(E_S+M_E)<B_C$. Here, the reference value $B_C$ may be a reference value for applying a machine learning determination system and may be, for example, 0.0015%, i.e., 0.000015. When it is determined that the sum of the communication error incidence rate $E_S$ and the determination error rate $M_E$ is less than the reference value $B_C$ (operation S350, YES), operation S370 may be performed, and when it is determined that the sum of the communication error incidence rate $E_S$ and the determination error rate $M_E$ is not less than or is equal to the reference value $B_C$, (operation S350, NO), operation S330 may be performed. Thus, operation S330 may be continuously performed until $(E_S+M_E)<B_C$. In operation S360, the storage controller 100a may predict whether a communication error in the command/address will occur by applying a determination system of the machine learning module 190.

For example, when the communication error incidence rate $E_S$ is 0.000007, the determination error rate $M_E$ is 0.000007, and the reference value $B_C$ is 0.000015, the sum of the communication error incidence rate $E_S$ and the determination error rate $M_E$, i.e., 01000014, is less than the reference value $B_C$, i.e., 0.000015. Accordingly, the storage controller 100a may predict whether a communication error will occur in commands/addresses thereafter issued by applying the determination system of the machine learning module 190 thereto.

In operation S370, it is determined whether a communication error incidence rate $ME_S$ according to a determination by machine learning is less than the reference value $B_C$. Here, the communication error incidence rate $ME_S$ may correspond to statistics of actual communication error incidence rates when communication error prediction is performed with respect to a command/address by applying the machine learning determination system and a CRC value is transmitted together with the command/address only when a communication error is predicted. When it is determined that the communication error incidence rate $ME_S$ is less than the reference value $B_C$ (operation S370, YES), operation S360 is performed. Thus, operation S360 may be performed continuously, and when it is determined that the communication error incidence rate $ME_S$ is not less than or is equal to the reference value $B_C$ (operation S370, NO), operation S330 may be performed.

For example, when the communication error incidence rate $ME_S$ is 0.000016 and the reference value $B_C$ is 0.000015, the communication error incidence rate $ME_S$ of 0.000016 is greater than the reference value $B_C$ of 0.000015. Thus, in operation S330, the machine learning module 190 may continuously collect determination data. When the communication error incidence rate $ME_S$ is less than the reference value $B_C$, the determination system of the machine learning module 190 may be determined to be appropriate. Accordingly, in operation S360, the storage controller 100a may continuously apply the determination system of the machine learning module 190 to predict whether a communication error will occur in commands/addresses. Operations S360 and S370 will be described in detail with reference to FIG. 15 below.

Figure 13:
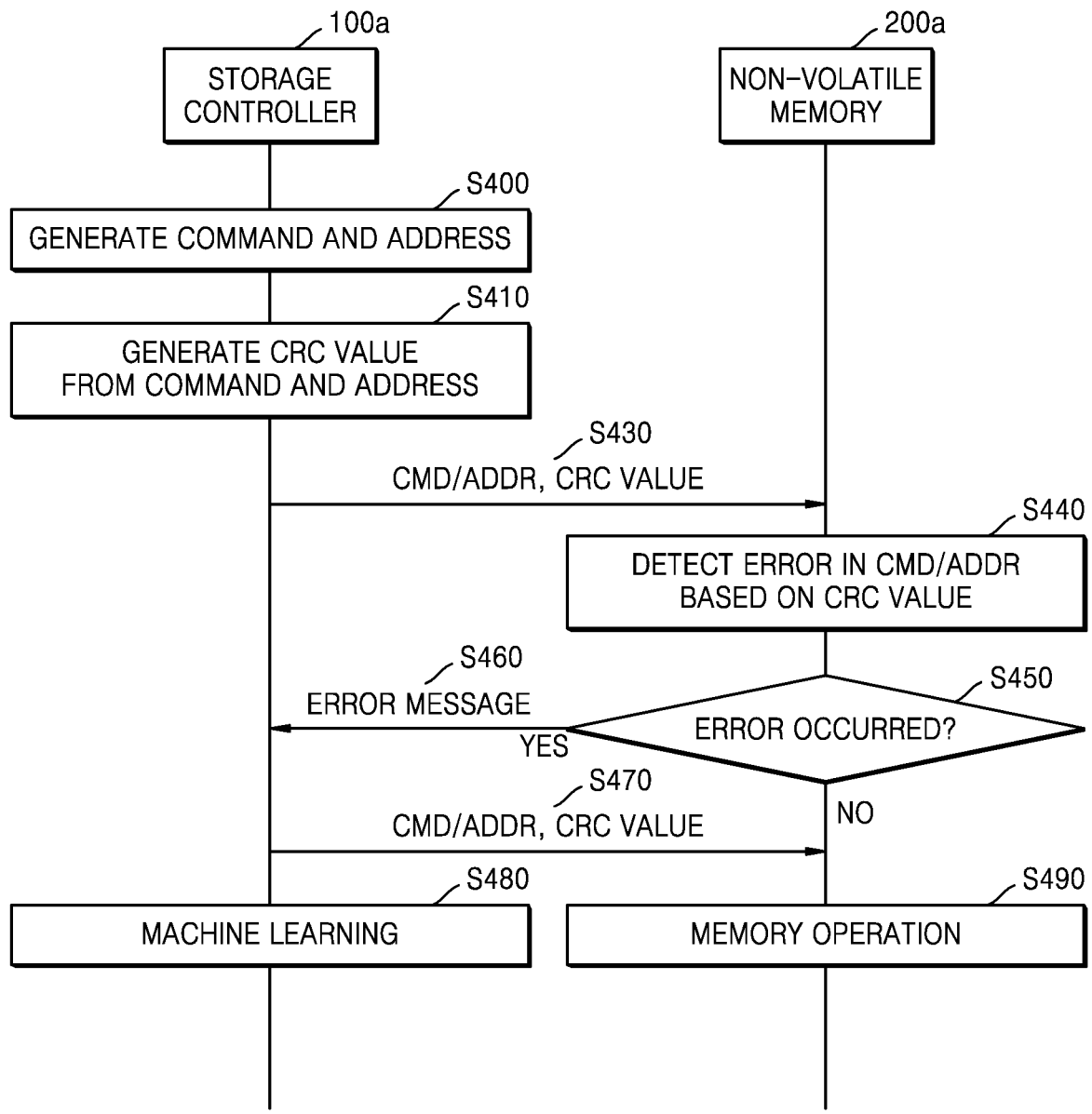
FIG. 13 is a flowchart of an operating method between a storage controller and a non-volatile memory in a first period according to an embodiment.

FIG. 13 is a flowchart of an operating method between the storage controller 100a and the non-volatile memory 200a in the first period according to an embodiment. Referring to FIGS. 9A to 13, a first period may correspond to a period from a point in time when a command/address CMD/ADDR is issued by the storage controller 100a to a point in time when the number n of times of processing the command/address CMD/ADDR reaches a first reference value N1. For example, the first reference value N1 may be 1,000,000.

In operation S400, the storage controller 100a generates a command and an address. In operation S410, the storage controller 100a generates a CRC value from the generated command and address. For example, as illustrated in FIG. 9C, the storage controller 100a may generate CRC values 913 from a first command CMD1 911 instructing a read operation and an address 912. For example, as illustrated in FIG. 10C, the storage controller 100a may generate CRC values 1013 from a first command CMD1 1011 instructing a write operation and an address 1012. In operation S430, the storage controller 100a transmits a command/address CMD/ADDR and CRC values (e.g., 911 to 914 of FIG. 9C or 1011 to 1014 of FIG. 10C) to the non-volatile memory 200a through a plurality of data signal lines.

In operation S440, the non-volatile memory 200a detects an error in the command/address CMD/ADDR, based on the CRC values. In operation S450, the non-volatile memory 200a determines whether an error has occurred. When it is determined that an error has occurred (operation S450, YES), in operation S460, the non-volatile memory 200a transmits an error message E to the storage controller 100a through the plurality of data signal lines. On the other hand, when it is determined that an error has not occurred (operation S450, NO), operation S490 is performed. In operation S470, the storage controller 100a transmits the command/address CMD/ADDR and CRC values (e.g., 915 to 918 of FIG. 9C or 1015 to 1018 of FIG. 10C) to the non-volatile memory 200a through a plurality of data signal lines, and then operation S490 is performed.

In operation S480, the storage controller 100a performs machine learning. Specifically, the machine learning module 190 may perform learning to determine whether a communication error has occurred in the command/address CMD/ADDR, based on whether an error message E is received with respect to the command/address CMD/ADDR in a first period. For example, the first period may correspond to a transmission period of first to 1,000,000-th commands/addresses. In this case, the machine learning module 190 may calculate a communication error incidence rate, based on statistics of actual errors occurring in the first to 1,000,000-th commands/addresses in the first period. In operation S490, the non-volatile memory 200a performs a memory operation according to a command/address.

Figure 14:
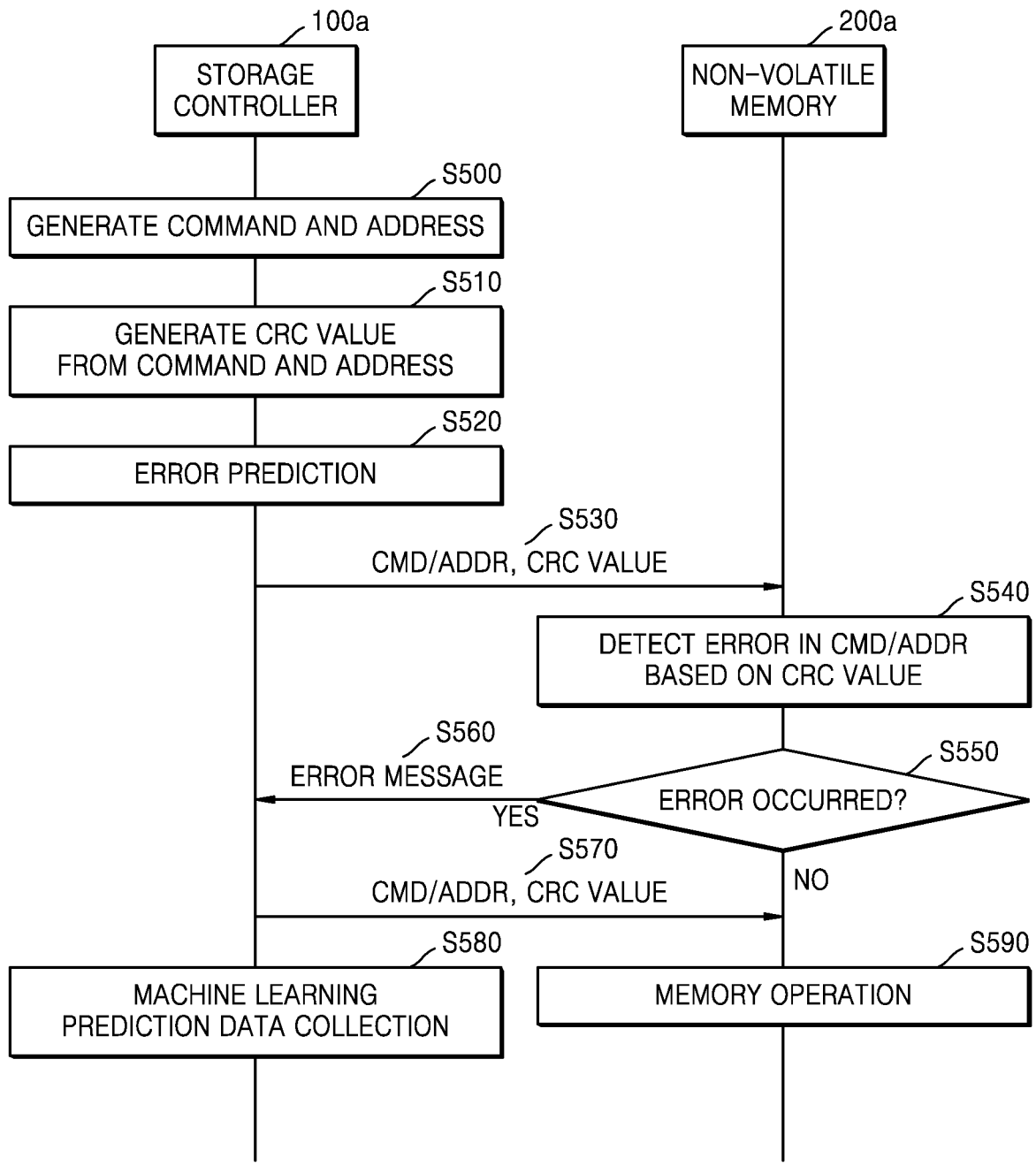
FIG. 14 is a flowchart of an operating method between a storage controller and a non-volatile memory in a second period according to an embodiment.

FIG. 14 is a flowchart of an operating method between a storage controller 100a and a non-volatile memory 200a in the second period according to an embodiment. Referring to FIGS. 9A to 14, a second period may correspond to a period from a point in time when the number n of times of processing a command/address CMD/ADDR by the storage controller 100a is a first reference value N1 to a point in time when the number n of times of processing reaches a second reference value N2. For example, the second reference value N2 may be 2,000,000. Operations S500 to S590 of FIG. 14 may be performed after operation S490 of FIG. 13.

In operation S500, the storage controller 100a generates a command and an address. In operation S510, the storage controller 100a generates a CRC value from the generated command and address. In operation S520, the machine learning module 190 predicts whether a communication error occurs in the command and address. Specifically, the machine learning module 190 may determine whether a communication error will occur with respect to each of commands and addresses issued in a second period, based on a result of learning in a first period. In an embodiment, operations S510 and S520 may be performed substantially simultaneously. In an embodiment, operation S520 may be performed prior to operation S510. In operation S530, the storage controller 100a transmits a command/address CMD/ADDR and CRC values (e.g., 911 to 914 of FIG. 9C or 1011 to 1014 of FIG. 10C) to the non-volatile memory 200a through a plurality of data signal lines.

In operation S540, the non-volatile memory 200a detects an error in the command/address CMD/ADDR, based on the CRC values. In operation S550, the non-volatile memory 200a determines whether an error has occurred. When it is determined that an error has occurred (operation S550, YES), in operation S560, the non-volatile memory 200a transmits an error message E to the storage controller 100a through the plurality of data signal lines. In operation S570, the storage controller 100a transmits the command/address CMD/ADDR and CRC values (e.g., 915 to 918 of FIG. 9C or 1015 to 1018 of FIG. 10C) to the non-volatile memory 200a through the plurality of data signal lines, and then operation S590 is performed.

In operation S580, the storage controller 100a collects prediction data or determination data through machine running. For example, the second period may correspond to a transmission period of 1,000,001-st to 2,000,000-th commands/addresses. Specifically, the machine learning module 190 may calculate a determination error rate $M_E$ of machine learning, based on a result of determining whether an error has occurred in each of the 1,000,001-st to 2,000,000-th commands/addresses in the second period and an actual error incidence rate. In addition, the machine learning module 190 may continuously perform learning to determine whether a communication error has occurred in the command/address CMD/ADDR, based on whether an error message E is received with respect to the command/address CMD/ADDR in the second period. In this case, the machine learning module 190 may calculate a communication error incidence rate $E_S$, based on statistics of actual errors occurring in the first to 2,000,000-th commands/addresses in the first and second periods. In operation S590, the non-volatile memory 200a performs a memory operation according to a command/address.

Figure 15:
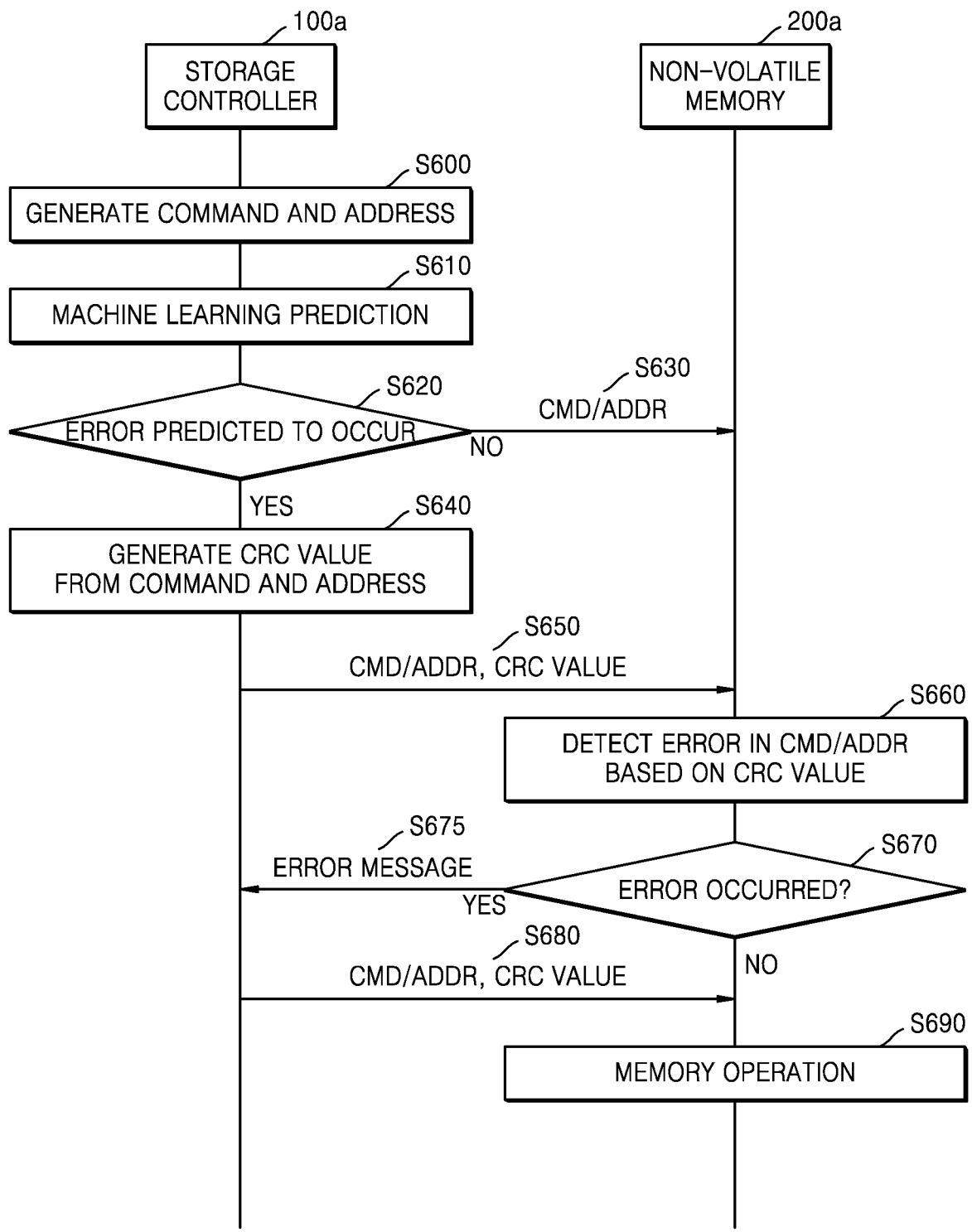
FIG. 15 is a flowchart of an operating method between a storage controller and a non-volatile memory in a third period according to an embodiment.

FIG. 15 is a flowchart of an operating method between a storage controller 100a and a non-volatile memory 200a in a third period according to an embodiment. Referring to FIGS. 9A to 15, a third period may correspond to a period after a period in which the number n of times of processing a command/address CMD/ADDR by the storage controller 100*a* is equal to the second reference value N2. For example, the second reference value N2 may be 2,000,000. Operations S600 to S690 of FIG. 15 may be performed after operation S590 of FIG. 14.

In operation S600, the storage controller 100*a* generates a command and an address. In operation S610, the machine learning module 190 predicts whether a communication error occurs in the command and address. In operation S620, the machine learning module 190 determines whether a communication error is predicted to occur. When a communication error is predicted to occur (operation S620, YES), operation S640 is performed. When a communication error is predicted to not occur (operation S620, NO), in operation S630, the storage controller 100*a* transmits a command/address CMD/ADDR to the non-volatile memory 200*a* through a plurality of data signal lines, and then operation S660 is performed.

In operation S640, the storage controller 100*a* generates CRC values from the command/address CMD/ADDR. In operation S650, the storage controller 100*a* transmits the command/address CMD/ADDR and the CRC values (e.g., 911 to 914 of FIG. 9C or 1011 to 1014 of FIG. 10C) to the non-volatile memory 200*a* through the plurality of data signal lines, and then operation S660 is performed.

In operation S660, the non-volatile memory 200*a* detects an error in the command/address CMD/ADDR, based on the CRC values. In operation S670, the non-volatile memory 200*a* determines whether an error has occurred. When it is determined that an error has occurred (operation S670, YES), in operation S675, the non-volatile memory 200*a* transmits an error message E to the storage controller 100*a* through the plurality of data signal lines. When it is determined that an error has not occurred (operation S670, NO), operation proceeds to operation S690. In operation S680, the storage controller 100*a* transmits the command/address CMD/ADDR and CRC values (e.g., 915 to 918 of FIG. 9C or 1015 to 1018 of FIG. 10C) to the non-volatile memory 200*a* through the plurality of data signal lines, and then operation S690 is performed. In operation S690, the non-volatile memory 200*a* performs a memory operation according to a command/address.

Figure 16A:
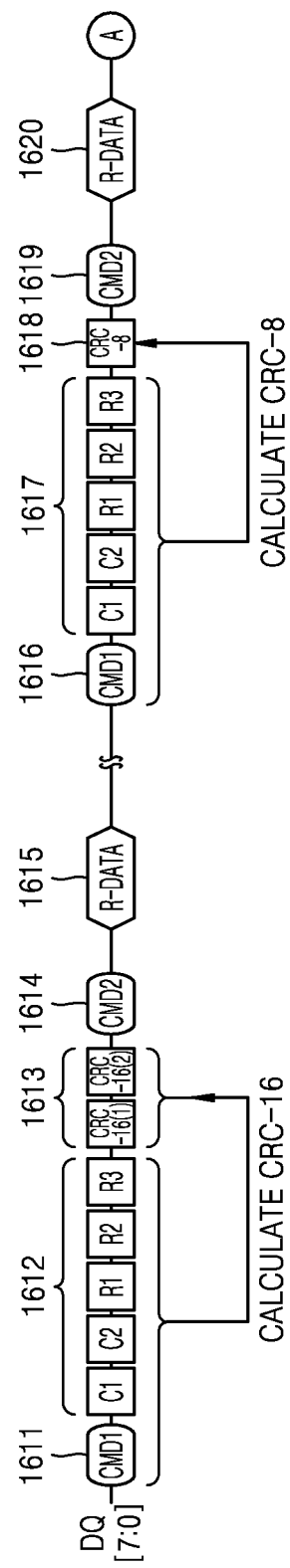
FIGS. 16A and 16B are timing diagrams illustrating communication between a storage controller and a non-volatile memory according to an embodiment.
Figure 16B:
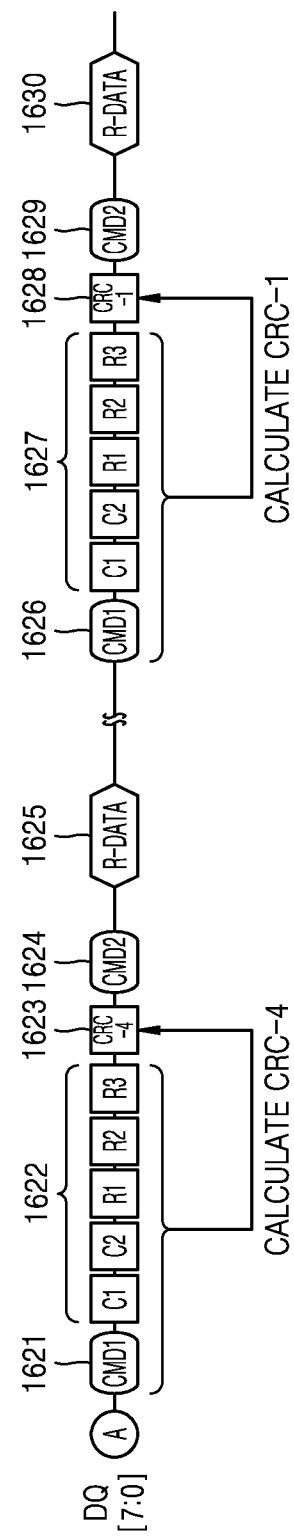

FIGS. 16A and 16B are timing diagrams illustrating communication between the storage controller 100*a* and the non-volatile memory 200*a* according to an embodiment.

Referring to FIGS. 8, 16A and 16B, the CRC module 125 includes a plurality of error detection logics including a first error detection logic and a second error detection logic, and generates an error detection signal, i.e., CRC values, with respect to a command and an address by using an error detection logic selected from among the plurality of error detection logics. Specifically, the CRC module 125 may apply the first error detection logic to perform an error detection operation on each of a plurality of commands/addresses, and change, as a selected error detection logic, the first error detection logic to the second error detection logic, based on a comparison result between a communication error rate of the plurality of commands/addresses and an error rate of the first error detection logic.

In an embodiment, the first error detection logic may be a CRC-k error detection logic, and the second error detection logic may be a CRC-m error detection logic. Here, k and m are positive integers and k is greater than m. The CRC module 125 may apply the CRC-k error detection logic to calculate a first CRC value from each of first commands/addresses, and apply the CRC-m error detection logic to calculate a second CRC value from each of second commands/addresses when a CRC-k error rate is greater than a communication error rate of the first commands/addresses.

In an embodiment, the plurality of error detection logics may further include a third error detection logic, and the first error detection logic may be the CRC-k error detection logic and the third error detection logic may be a CRC-l error detection logic. Here, k and l are positive integers and k is less than l. The CRC module 125 may apply the CRC-k error detection logic to calculate a first CRC value from each of the first commands/addresses, and apply the CRC-l error detection logic to calculate a second CRC value from each of second commands/addresses when a CRC-k error rate is not greater than a communication error rate of the first commands/addresses.

Specifically, the storage controller 100*a* may apply a CRC-16 error detection logic in a first period to calculate a CRC value, i.e., CRC-16, from a command/address. For example, the first period may correspond to a period from a point in time when commands/addresses are issued to a point in time when the number of times of processing or issuing the commands/addresses reaches a certain reference value. The storage controller 100*a* may sequentially transmit a first command CMD1 1611, an address 1612, CRC values 1613, and a second command CMD2 1614 to the non-volatile memory 200*a* through a plurality of data signal lines. For example, the first command CMD1 1611 may include an input command (e.g., 80*h*) indicating that the type of a memory operation is a read operation, and the address 1612 may include first and second column addresses C1 and C2 and first to third row addresses R1, R2 and R3. The second command CMD2 1614 may be a confirm command (e.g., 50 h, 20 h, or 30 h) indicating the size of a page to be read.

The CRC module 125 may calculate the CRC values 1613 from the first command CMD1 1611 and the address 1612. For example, the CRC module 125 may apply the CRC-16 error detection logic to perform CRC on the first command CMD1 1611 and the address 1612 so as to calculate CRC-16(1) and CRC-16(2), and the CRC-16(1) may be provided as an 8-bit signal and the CRC-16(2) may be provided as an 8-bit signal. The non-volatile memory 200*a* may determine whether a communication error has occurred in the first command CMD1 1611 and the address 1612, based on the CRC values 1613. When it is determined that a communication error has not occurred in the first command CMD1 1611 and the address 1612, the non-volatile memory 200*a* may perform the read operation and transmit read data 1615 to the storage controller 100*a*.

The storage controller 100*a* may apply a CRC-8 error detection logic in a second period after the first period to calculate a CRC value, i.e., CRC-8, from a command/address. For example, the second period may correspond to a period from a point in time when the first period ends to a point in time when the number of times of processing the commands/addresses or the number of times of issuing the commands/addresses reaches a certain reference value. The storage controller 100*a* may sequentially transmit a first command CMD1 1616, an address 1617, CRC values 1618, and a second command CMD2 1619 to the non-volatile memory 200*a* through the plurality of data signal lines.

The CRC module 125 may calculate the CRC values 1618 from the first command CMD1 1616 and the address 1617. For example, the CRC module 125 may apply the CRC-8 error detection logic to perform CRC on the first command CMD1 1616 and the address 1617 so as to calculate CRC-8, and the CRC-8 may be provided as an 8-bit signal. The non-volatile memory 200*a* may determine whether a communication error has occurred in the first command CMD1 1616 and the address 1617, based on the CRC values 1618. When it is determined that a communication error has not occurred in the first command CMD1 1616 and the address 1617, the non-volatile memory 200a may perform the read operation and transmit read data 1620 to the storage controller 100a.

The storage controller 100a may apply a CRC-4 error detection logic in a third period after the second period to calculate a CRC value, i.e., CRC-4, from a command/address. For example, the third period may correspond to a period from a point in time when the second period ends to a point in time when the number of times of processing or issuing the commands/addresses reaches a certain reference value. The storage controller 100a may sequentially transmit a first command CMD1 1621, an address 1622, CRC values 1623, and a second command CMD2 1624 to the non-volatile memory 200a through the plurality of data signal lines.

The CRC module 125 may calculate the CRC values 1623 from the first command CMD1 1621 and the address 1622. For example, the CRC module 125 may apply the CRC-4 error detection logic to perform CRC on the first command CMD1 1621 and the address 1622 so as to calculate CRC-4, and the CRC-4 may be provided as a 4-bit signal. The non-volatile memory 200a may determine whether a communication error has occurred in the first command CMD1 1621 and the address 1622, based on the CRC values 1623. When it is determined that a communication error has not occurred in the first command CMD1 1621 and the address 1632, the non-volatile memory 200a may perform the read operation and transmit read data 1625 to the storage controller 100a.

The storage controller 100a may apply a CRC-1 error detection logic in a fourth period after the third period to calculate a CRC value, i.e., CRC-1, from a command/address. For example, the fourth period may correspond to a period from a point in time when the third period ends to a point in time when the number of times of processing or issuing the commands/addresses reaches a certain reference value. The storage controller 100a may sequentially transmit a first command 1626, an address 1627, CRC values 1628, and a second command 1629 to the non-volatile memory 200a through the plurality of data signal lines.

The CRC module 125 may calculate the CRC values 1628 from the first command 1626 and the address 1627. For example, the CRC module 125 may apply the CRC-1 error detection logic to perform CRC on the first command 1626 and the address 1627 so as to calculate CRC-1, and the CRC-1 may be provided as a 1-bit signal. The non-volatile memory 200a may determine whether a communication error has occurred in the first command 1626 and the address 1627, based on the CRC values 1628. When it is determined that a communication error has not occurred in the first command 16262 and the address 1617, the non-volatile memory 200a may perform the read operation and transmit read data 1630 to the storage controller 100a. However, the embodiments are not limited thereto, and CRC-1 may be included in a reserved bit of the second command 1629.

Figure 17:
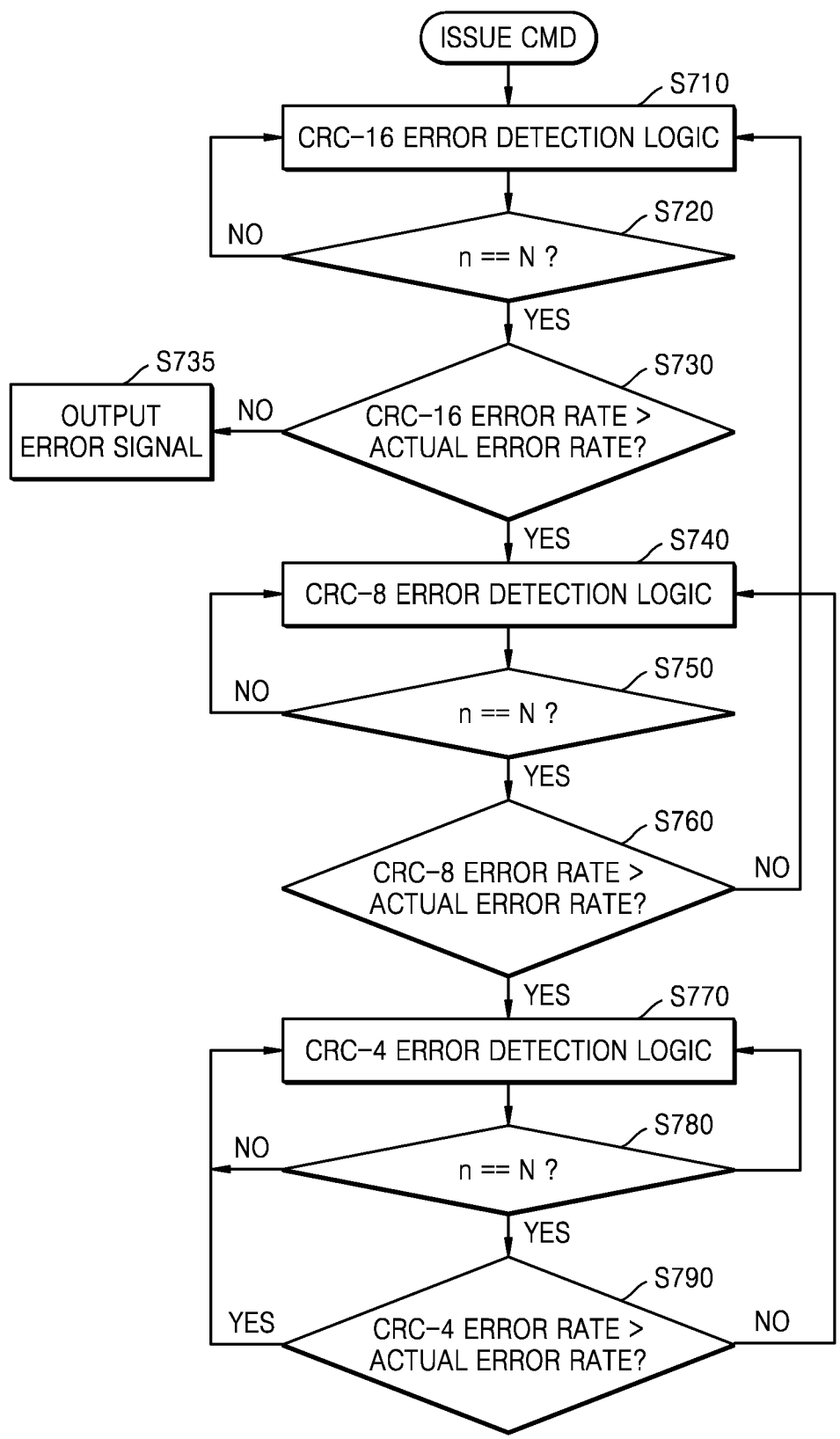
FIG. 17 is a flowchart of an operating method of a storage controller according to an embodiment.

FIG. 17 is a flowchart of an operating method of a storage controller 100a according to an embodiment.

Referring to FIGS. 8 and 17, the storage controller 100a may compare an actual error rate of commands/addresses and the reliability of an error detection logic, and dynamically change the error detection logic according to a result of the comparison. The storage controller 100a may repeatedly perform the comparison operation a reference number N of times. Specifically, when the number n of times of processing the commands/addresses corresponds to the reference number N of times after a first error detection logic is applied, the storage controller 100a may perform the comparison operation to determine whether to change an error detection logic. When the error detection logic is changed to a second error detection logic from the first error detection logic, the storage controller 100a may perform the comparison operation to determine whether to change the error detection logic when the number n of times of processing the commands/addressees corresponds to the reference number N of times after the second error detection logic is applied. An operating method of the storage controller 100a when an error detection logic is a CRC error detection logic will be described with reference to FIGS. 8, 16 and 17 below.

When a command is issued, in operation S710, the CRC module 125 calculates a CRC value from a command/address by applying the CRC-16 error detection logic. In operation S720, it is determined whether the number n of times of processing the commands/addresses when the CRC-16 error detection logic is applied is equal to a reference number N of times, i.e., n=N. For example, the reference number N may be 5,000,000 but the embodiments are not limited thereto. When it is determined that the number n of times of processing the commands/addresses is less than the reference number N of times (operation S720, NO), operation S710 is performed. Thus, the CRC module 125 may continuously apply the CRC-16 error detection logic to calculate a CRC value from the commands/addresses until n=N.

When the number n of times of processing the commands/addresses is equal to the reference number N of times (operation S720, YES), in operation S730, it is determined whether an error rate of CRC-16 is greater than an actual error rate. For example, the error rate of CRC-16 is 0.000015258789. When the error rate of CRC-16 is greater than the actual error rate (operation S730, YES), operation S740 is performed. When the error rate of CRC-16 is not greater than (i.e., is less than or equal to) the actual error rate (operation S730, NO), it may be determined that the actual error rate is very high. In this case, an error signal may be generated and output (operation S735).

In operation S740, the CRC module 125 calculates a CRC value from the commands/addresses by applying a CRC-8 error detection logic with a higher error rate than CRC-16. In operation 750, it is determined whether the number n of times of processing the commands/addresses when the CRC-8 error detection logic is applied is equal to the reference number N of times, i.e., n=N. For example, the reference number N may be 5,000,000 but the embodiments are not limited thereto. When it is determined that the number n of times of processing the commands/addresses is less than the reference number N of times (operation S750, NO), operation S740 may be performed. in operation S740, the CRC module 125 may continuously apply the CRC-8 error detection logic to calculate a CRC value from the commands/addresses.

When the number n of times of processing the commands/addresses is equal to the reference number N of times (operation S750, YES), in operation S760, it is determined whether an error rate of CRC-8 is greater than an actual error rate. When the error rate of CRC-8 is greater than the actual error rate (operation S760, YES), operation S770 is performed. When the error rate of CRC-8 is not greater than or is equal to the actual error rate (operation S760, NO), it may be determined that the actual error rate is high. In this case, the operating method returns to operation S710 and the CRC module 125 calculates a CRC value from a command/ address by applying the CRC-16 error detection logic. For example, when the error rate of CRC-8 is 0.00390625 and an actual error rate $E_S$ is 0.0015, the error rate of CRC-8 is greater than the actual error rate $E_S$ and thus operation S770 may be performed.

In operation S770, the CRC module 125 calculates a CRC value from the commands/addresses by applying a CRC-4 error detection logic with a higher error rate than CRC-8. In operation S780, it is determined whether the number n of times of processing the commands/addresses when the CRC-4 error detection logic is applied is equal to the reference number N of times, i.e., n=N. For example, the reference number N may be 5,000,000 but the embodiments are not limited thereto. When it is determined that the number n of times of processing the commands/addresses is less than the reference number N of times (operation S780, NO), operation S770 is performed. In operation S770, the CRC module 125 may continuously apply the CRC-4 error detection logic to calculate a CRC value from the commands/addresses.

When the number n of times of processing the commands/ addresses is equal to the reference number N of times (operation S780, YES), in operation S790, it is determined whether an error rate of CRC-4 is greater than an actual error rate. For example, the error rate of CRC-4 is 0.0625. When the error rate of CRC-4 is greater than the actual error rate (operation S790, YES), operation S770 is performed. When the error rate of CRC-4 is not greater than or is equal to the actual error rate (operation S790, NO), it may be determined that the actual error rate is high. In this case, the operating method returns to operation S740 and the CRC module 125 calculates a CRC value from a command/address by applying the CRC-8 error detection logic.

According to the embodiment of FIG. 17, the storage controller 100*a* may select one of the plurality of error detection logics according to an error rate of the commands/ addresses, thereby reducing the amount of calculation of the storage controller 100*a* according to an actual communication error rate.

Figure 18:
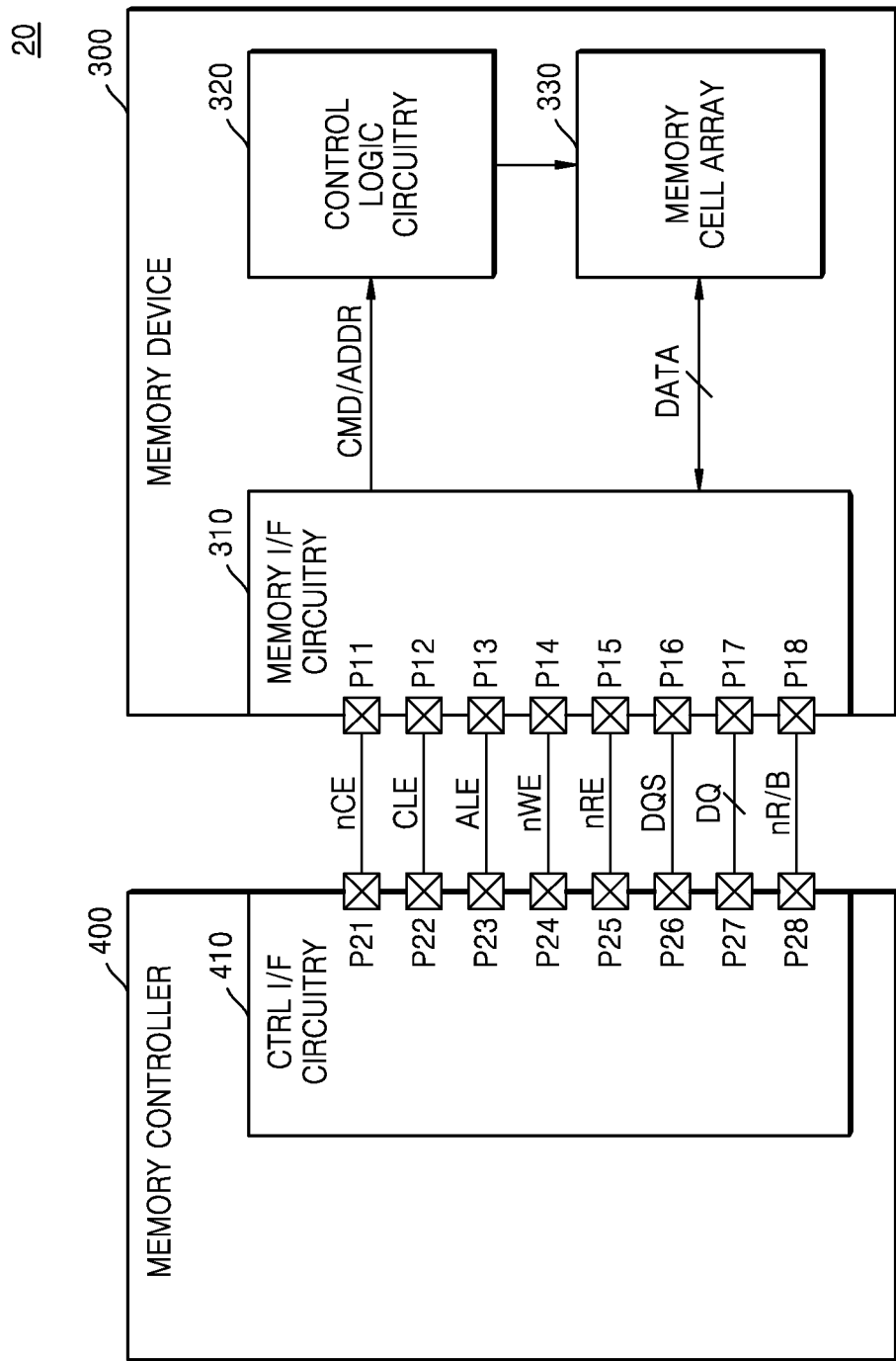
FIG. 18 is a block diagram of a storage device according to an embodiment.

FIG. 18 is a block diagram of a storage device 20 according to an embodiment. Referring to FIG. 18, the memory device 20 may include a memory device 300 and a storage controller 400. The memory device 300 may correspond to the non-volatile memory 200 of FIG. 1 or the non-volatile memory 200*a* of FIG. 8. The memory controller 400 may correspond to the storage controller 100 of FIG. 1 or the storage controller 100*a* of FIG. 8.

The memory device 300 may include a first pin P11, a second pin P12, a third pin P13, a fourth pin P14, a fifth pin P15, a sixth pin P16, a seventh pin P17, an eighth pin P18, a memory interface (I/F) circuitry 310, a control logic circuitry 320, and a memory cell array 330. The memory interface (I/F) circuitry 310 may receive a chip enable signal nCE from the memory controller 400 through the first pin P11. The memory interface (I/F) circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface (I/F) circuitry 310 may transmit and receive signals to and from the memory controller 400 through the second to eighth pins P12 to P18.

The memory interface (I/F) circuitry 310 may receive a command latch enable signal CLE, an address latch enable signal ALE, and a write enable signal nWE from the memory controller 400 through the second to fourth pins P12 to P14. The memory interface (I/F) circuitry 310 may receive a data signal DQ from the memory controller 400 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface (I/F) circuitry 310 may obtain the command CMD from the data signal DQ, which is received in an enable section (e.g., a high-level state) of the command latch enable signal CLE based on toggle time points of the write enable signal nWE. The memory interface (I/F) circuitry 310 may obtain the address ADDR from the data signal DQ, which is received in an enable section (e.g., a high-level state) of the address latch enable signal ALE based on the toggle time points of the write enable signal nWE.

In an embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface (I/F) circuitry 310 may obtain the command CMD or the address ADDR based on toggle time points of the write enable signal nWE.

The memory interface (I/F) circuitry 310 may receive a read enable signal nRE from the memory controller 400 through the fifth pin P15. The memory interface (I/F) circuitry 310 may receive a data strobe signal DQS from the memory controller 400 through the sixth pin P16 or transmit the data strobe signal DQS to the memory controller 400.

In a data (DATA) output operation of the memory device 300, the memory interface (I/F) circuitry 310 may receive the read enable signal nRE, which toggles through the fifth pin P15, before outputting the data DATA. The memory interface (I/F) circuitry 310 may generate the data strobe signal DQS, which toggles based on the toggling of the read enable signal nRE. For example, the memory interface (I/F) circuitry 310 may generate a data strobe signal DQS, which starts toggling after a predetermined delay (e.g., tDQSRE), based on a toggling start time of the read enable signal nRE. The memory interface (I/F) circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface (I/F) circuitry 310 may receive the data strobe signal DQS, which toggles, along with the data DATA from the memory controller 400. The memory interface (I/F) circuitry 310 may obtain the data DATA from the data signal DQ based on toggle time points of the data strobe signal DQS. For example, the memory interface (I/F) circuitry 310 may sample the data signal DQ at rising and falling edges of the data strobe signal DQS and obtain the data DATA.

The memory interface (I/F) circuitry 310 may transmit a ready/busy output signal nR/B to the memory controller 400 through the eighth pin P18. The memory interface (I/F) circuitry 310 may transmit state information of the memory device 300 through the ready/busy output signal nR/B to the memory controller 400. When the memory device 300 is in a busy state (i.e., when operations are being performed in the memory device 300), the memory interface (I/F) circuitry 310 may transmit a ready/busy output signal nR/B indicating the busy state to the memory controller 400. When the memory device 300 is in a ready state (i.e., when operations are not performed or completed in the memory device 300), the memory interface (I/F) circuitry 310 may transmit a ready/busy output signal nR/B indicating the ready state to the memory controller 400. For example, while the memory device 300 is reading data DATA from the memory cell array 330 in response to a page read command, the memory interface (I/F) circuitry 310 may transmit a ready/busy output signal nR/B indicating a busy state (e.g., a low level) to the memory controller 400. For example, while the memory device 300 is programming data DATA to the memory cell array 330 in response to a program command, the memory interface (I/F) circuitry 310 may transmit a ready/busy output signal nR/B indicating the busy state to the memory controller 400.

The control logic circuitry 320 may control all operations of the memory device 300. The control logic circuitry 320 may receive the command/address CMD/ADDR obtained from the memory interface (I/F) circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface (I/F) circuitry 310, via the control of the control logic circuitry 320. The memory cell array 330 may output the stored data DATA to the memory interface (I/F) circuitry 310 via the control of the control logic circuitry 320.

The memory cell array 330 may include a plurality of memory cells. For example, the plurality of memory cells may be flash memory cells. However, the embodiments are not limited thereto, and in some embodiments the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include a first pin P21, a second pin P22, a third pin P23, a fourth pin P24, a fifth pin P25, a sixth pin P26, a seventh pin P27, an eighth pin P28 and a controller interface (I/F) circuitry 410. The first to eighth pins P21 to P28 may respectively correspond to the first to eighth pins P11 to P18 of the memory device 300.

The controller interface (I/F) circuitry 410 may transmit a chip enable signal nCE to the memory device 300 through the first pin P21. The controller interface (I/F) circuitry 410 may transmit and receive signals to and from the memory device 300, which is selected by the chip enable signal nCE, through the second to eighth pins P22 to P28.

The controller interface (I/F) circuitry 410 may transmit the command latch enable signal CLE, the address latch enable signal ALE, and the write enable signal nWE to the memory device 300 through the second to fourth pins P22 to P24. The controller interface (I/F) circuitry 410 may transmit or receive the data signal DQ to and from the memory device 300 through the seventh pin P27.

The controller interface (I/F) circuitry 410 may transmit the data signal DQ including the command CMD or the address ADDR to the memory device 300 along with the write enable signal nWE, which toggles. The controller interface (I/F) circuitry 410 may transmit the data signal DQ including the command CMD to the memory device 300 by transmitting a command latch enable signal CLE having an enable state. Also, the controller interface (I/F) circuitry 410 may transmit the data signal DQ including the address ADDR to the memory device 300 by transmitting an address latch enable signal ALE having an enable state.

The controller interface (I/F) circuitry 410 may transmit the read enable signal nRE to the memory device 300 through the fifth pin P25. The controller interface (I/F) circuitry 410 may receive or transmit the data strobe signal DQS from or to the memory device 300 through the sixth pin P26.

In a data (DATA) output operation of the memory device 300, the controller interface (I/F) circuitry 410 may generate a read enable signal nRE, which toggles, and transmit the read enable signal nRE to the memory device 300. For example, before outputting data DATA, the controller interface (I/F) circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface (I/F) circuitry 410 may receive the data signal DQ including the data DATA along with the data strobe signal DQS, which toggles, from the memory device 300. The controller interface (I/F) circuitry 410 may obtain the data DATA from the data signal DQ based on a toggle time point of the data strobe signal DQS.

In a data (DATA) input operation of the memory device 300, the controller interface (I/F) circuitry 410 may generate a data strobe signal DQS, which toggles. For example, before transmitting data DATA, the controller interface (I/F) circuitry 410 may generate a data strobe signal DQS, which is changed from a static state (e.g., a high level or a low level) to a toggling state. The controller interface (I/F) circuitry 410 may transmit the data signal DQ including the data DATA to the memory device 300 based on toggle time points of the data strobe signal DQS.

The controller interface (I/F) circuitry 410 may receive a ready/busy output signal nR/B from the memory device 300 through the eighth pin P28. The controller interface (I/F) circuitry 410 may determine state information of the memory device 300 based on the ready/busy output signal nR/B.

Figure 19:
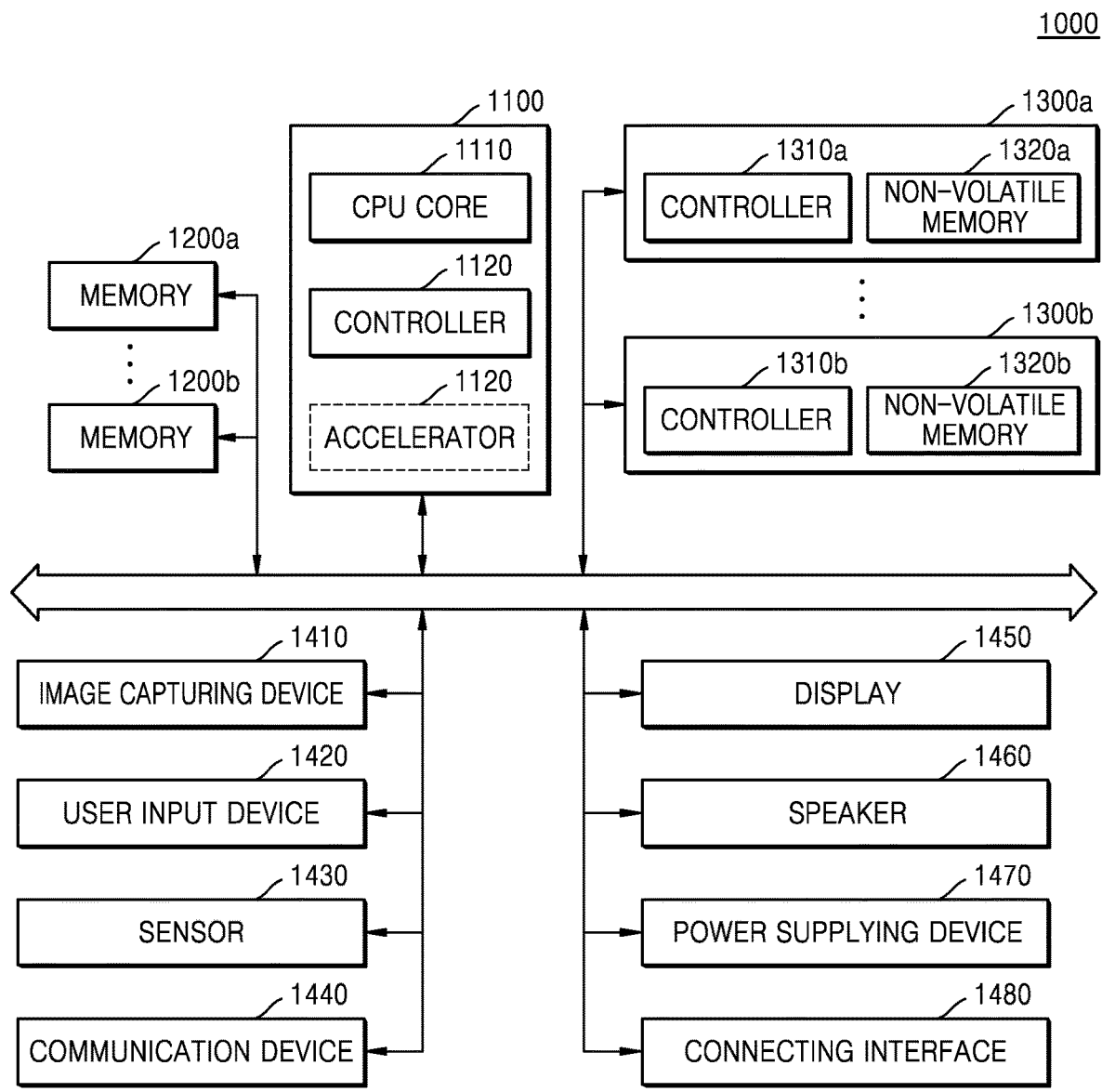
FIG. 19 is a diagram illustrating a system to which a storage device according to an embodiment is applied.

FIG. 19 is a diagram of a system 1000 to which a storage device is applied, according to an embodiment. The system 1000 of FIG. 19 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 19 is not necessarily limited to the mobile system and in various embodiments may be a PC, a laptop computer, a server, a media player, or an automotive device (e.g., a navigation device).

Referring to FIG. 19, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (CONTROLLER) 1310a and 1310b and Non-Volatile Memories (NON-VOLATILE MEMORY) 1320a and 1320b configured to store data via the control of the storage controllers 1310a and 1310b. Although the Non-Volatile Memories 1320a and 1320b may include flash memories having a two-dimensional (2D) structure or a three-dimensional (3D) V-NAND structure, the Non-Volatile Memories 1320a and 1320b may include other types of Non-Volatile Memories, such as PRAM and/or RRAM. Referring to FIG. 19, the storage devices 1300a and 1300b may correspond to the storage devices 10, 10a or 20 described above with reference to FIG. 1, 8 or 15.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

While various embodiments have been particularly shown and described above, it will be understood that various changes in form and details may be made therein without departing from the spirit and scope of the following claims.

What is claimed is:

1. A storage device comprising:
   a non-volatile memory; and
   a storage controller configured to control the non-volatile memory,
   wherein the storage controller comprises:
   a command and address generator configured to generate a first command, an address, and a second command as a command set, including an error detection signal for detecting a communication error in the first command and the address;
   an error detection module configured to generate the error detection signal from the first command and the address; and
   an interface circuit configured to sequentially transmit the first command, the address, and the second command as the command set to the non-volatile memory,
   wherein the first command indicates a type of a memory operation to be performed in the non-volatile memory, and the second command corresponds to a confirm command related to the memory operation, and
   wherein the non-volatile memory is configured to detect the communication error in the first command and the address, based on the error detection signal.

2. The storage device of claim 1, wherein the error detection signal comprises a 1-bit signal.

3. The storage device of claim 1, wherein the error detection module is further configured to generate a parity bit from the first command and the address, wherein the parity bit is the error detection signal.

4. The storage device of claim 1, wherein the error detection module is further configured to generate a cyclic redundancy check (CRC) value from the first command and the address, wherein the CRC value is the error detection signal.

5. The storage device of claim 1, wherein the error detection module is further configured to generate a checksum from the first command and the address, wherein the checksum is the error detection signal.

6. The storage device of claim 1, wherein the interface circuit is further configured to:
   transmit, to the non-volatile memory, a command latch enable signal having an enable level in a transmission period of the first command and the second command; and
   transmit, to the non-volatile memory, an address latch enable signal having an enable level in a transmission period of the address.

7. The storage device of claim 1, wherein the non-volatile memory is configured to:
   transmit an error message to the storage controller when the communication error is detected.

8. The storage device of claim 7, wherein the interface circuit sequentially transmits the first command, the address, and the second command again to the non-volatile memory based on the error message.

9. The storage device of claim 1, wherein the storage controller further comprises a machine learning module configured to predict the communication error in the first command and the address.

10. The storage device of claim 9, wherein the machine learning module is further configured to control the command and address generator and the error detection module to transmit the error detection signal to the non-volatile memory when the communication error is predicted and to not transmit the error detection signal to the non-volatile memory when the communication error is not predicted.

11. A storage device comprising:
   a non-volatile memory; and
   a storage controller configured to control the non-volatile memory,
   wherein the storage controller comprises:
   a command and address generator configured to generate a plurality of commands and a plurality of addresses;
   a machine learning module configured to predict whether a communication error occurs in a command and an address to be provided to the non-volatile memory, based on a communication error rate of the plurality of commands and the plurality of addresses, and based on a determination error rate of the plurality of commands and the plurality of addresses;
   an error detection module configured to generate an error detection signal from the command and the address when it is predicted that the communication error has occurred; and
   an interface circuit configured to transmit the command, the address, and the error detection signal to the non-volatile memory when it is predicted that the communication error has occurred,
   wherein the non-volatile memory is configured to detect the communication error in the command and the address, based on the error detection signal.

12. The storage device of claim 11, wherein the communication error rate includes statistics based on actual communication errors occurring in the plurality of commands and the plurality of addresses transmitted to the non-volatile memory from the storage controller in a certain period, and
   the determination error rate corresponds to a machine learning determination error rate determined by the machine learning module.

13. The storage device of claim 11, wherein the machine learning module is further configured to perform learning with first commands and addresses issued in a first period and as to whether a communication error occurs in each of the first commands and addresses.

14. The storage device of claim 13, wherein the machine learning module is further configured to determine whether a communication error occurs in each of second commands and addresses issued in a second period after the first period and collect determination data according to a result of the determination.

15. The storage device of claim 14, wherein the communication error rate is determined, based on whether a communication error occurs in each of the first commands and addresses and each of the second commands and addresses, and
   the determination error rate is determined according to the result of determining whether the communication error occurs in each of the second commands and addresses.

16. The storage device of claim 15, wherein, when the second period ends, the machine learning module is further configured to predict whether a communication error occurs in the command and the address by applying a machine learning determination system when a sum of the communication error rate and the determination error rate is less than a reference value.

17. The storage device of claim 11, wherein the command comprises a first command and a second command,
   wherein the interface circuit is further configured to sequentially transmit the first command, the address, and the second command to the non-volatile memory when it is predicted that the communication error has not occurred in the command and the address.

18. The storage device of claim 11, wherein the error detection module comprises a cyclic redundancy check (CRC) module configured to generate a CRC value from the command and the address, wherein the CRC value is the error detection signal.

19. The storage device of claim 11, wherein the error detection module is further configured to apply an error detection logic selected from among a plurality of error detection logics to generate the error detection signal from the command and the address, and
   the machine learning module is further configured to dynamically change the error detection logic selected from among the plurality of error detection logics, based on an error rate of each of the plurality of error detection logics and based on the communication error rate.

20. A storage device comprising:
   a non-volatile memory; and
   a storage controller configured to control the non-volatile memory,
   wherein the storage controller comprises:
   a command and address generator configured to generate a command and an address;
   an error detection module including a plurality of error detection logics including a first error detection logic and a second error detection logic, and the error detection module configured to generate an error detection signal with respect to the command and the address by using an error detection logic selected from among the plurality of error detection logics; and
   an interface circuit configured to sequentially transmit the command, the address, and the error detection signal to the non-volatile memory, wherein the error detection module is further configured to:
perform error detection on each of a plurality of commands and addresses by applying the first error detection logic; and
change the selected error detection logic from the first error detection logic to the second error detection logic according to a comparison result between a communication error rate of the plurality of commands and addresses and an error rate of the first error detection logic, and
wherein the non-volatile memory is configured to detect a communication error in the command and the address, based on the error detection signal.

* * * * *